United States Patent
Yun et al.

(10) Patent No.: US 9,292,764 B2
(45) Date of Patent: Mar. 22, 2016

(54) METHOD AND APPARATUS FOR SELECTIVELY PROVIDING INFORMATION ON OBJECTS IN A CAPTURED IMAGE

(71) Applicant: QUALCOMM Incorporated, San Diego, CA (US)

(72) Inventors: Sungrack Yun, Seongnam (KR); Kyu Woong Hwang, Taejon (KR); Jun-Cheol Cho, Seoul (KR); Taesu Kim, Seongnam (KR); Minho Jin, Gyeonggi-do (KR); Yongwoo Cho, Seoul (KR); Kang Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 14/029,431

(22) Filed: Sep. 17, 2013

(65) Prior Publication Data

US 2015/0078667 A1    Mar. 19, 2015

(51) Int. Cl.
*G06K 9/46* (2006.01)
*G06K 9/66* (2006.01)
*G06K 9/62* (2006.01)
*G06F 17/30* (2006.01)
*G06F 3/01* (2006.01)
*G06K 9/00* (2006.01)
*H04W 4/02* (2009.01)

(52) U.S. Cl.
CPC .............. *G06K 9/6201* (2013.01); *G06F 3/012* (2013.01); *G06F 17/30047* (2013.01); *G06F 17/3087* (2013.01); *G06F 17/30241* (2013.01); *G06F 17/30247* (2013.01); *G06F 17/30265* (2013.01); *G06K 9/00* (2013.01); *G06K 9/00671* (2013.01); *H04W 4/02* (2013.01)

(58) Field of Classification Search
CPC ........................... G06K 9/00671; G06F 1/163
See application file for complete search history.

(56) References Cited

U.S. PATENT DOCUMENTS

| 6,975,991 | B2 * | 12/2005 | Basson | A61F 11/04 704/271 |
| 8,094,091 | B2 * | 1/2012 | Noma | G02B 27/017 345/427 |
| 8,131,750 | B2 | 3/2012 | Bathiche et al. | |
| 8,199,974 | B1 | 6/2012 | Prada Gomez et al. | |

(Continued)

FOREIGN PATENT DOCUMENTS

EP    2410490 A2    1/2012

OTHER PUBLICATIONS

Bane R. et al., "Interactive Tools for Virtual X-Ray Vision in Mobile Augmented Reality", Proceedings of the 3rd IEEE/ACM International Symposium on Mixed and Augmentation Reality, IEEE, Piscataway, NJ, USA, Nov. 2, 2004, pp. 231-239.

(Continued)

*Primary Examiner* — Gregory M Desire
(74) *Attorney, Agent, or Firm* — Toler Law Group, PC

(57) ABSTRACT

A method for providing object information for a scene in a wearable computer is disclosed. In this method, an image of the scene is captured. Further, the method includes determining a current location of the wearable computer and a view direction of an image sensor of the wearable computer and extracting at least one feature from the image indicative of at least one object. Based on the current location, the view direction, and the at least one feature, information on the at least one object is determined. Then, the determined information is output.

50 Claims, 15 Drawing Sheets

(56) References Cited

U.S. PATENT DOCUMENTS

| | | | |
|---|---|---|---|
| 8,203,605 B1 | 6/2012 | Starner | |
| 8,941,560 B2* | 1/2015 | Wong et al. | 345/8 |
| 9,069,382 B1* | 6/2015 | Starner et al. | |
| 9,081,177 B2* | 7/2015 | Wong et al. | |
| 2009/0128449 A1 | 5/2009 | Brown et al. | |
| 2009/0319181 A1 | 12/2009 | Khosravy et al. | |
| 2011/0140994 A1* | 6/2011 | Noma | G02B 27/017 345/8 |
| 2011/0313653 A1 | 12/2011 | Lindner | |
| 2012/0092328 A1 | 4/2012 | Flaks et al. | |
| 2012/0299961 A1 | 11/2012 | Ramkumar et al. | |
| 2013/0069985 A1 | 3/2013 | Wong et al. | |
| 2014/0176603 A1* | 6/2014 | Kumar et al. | 345/633 |
| 2015/0049952 A1* | 2/2015 | Cholayil | A61B 5/107 382/195 |
| 2015/0070262 A1* | 3/2015 | Peters | G02B 27/017 345/156 |
| 2015/0078667 A1* | 3/2015 | Yun et al. | 382/195 |
| 2015/0168727 A1* | 6/2015 | Qaddoura | G02B 27/0172 |
| 2015/0169186 A1* | 6/2015 | Neven et al. | G06F 3/04842 |
| 2015/0193977 A1* | 7/2015 | Johnson et al. | G06T 19/006 |

OTHER PUBLICATIONS

International Search Report and Written Opinion—PCT/US2014/054312—ISA/EPO—Feb. 2, 2015, 13 pages.

Stanek K., et al., "Cartographically Augmented Reality", 3rd ISDE Digital Earth Summit, Jun. 12, 2010, XP055014287, Nessebar, Bulgaria Retrieved from the Internet : URL: http://cartography-gis.com/pdf/35_Friedmannova_Czech_Republic_abstract.pdf, 10 pages.

Zhou F. et al., "Trends in Augmented Reality Tracking, interaction and display: A review of ten years of ISMAR", 7th IEEE/ACM International Symposium on Mixed and Augmented reality, 2008, pp. 193-202.

* cited by examiner

| LOCATION | VIEW DIRECTION | FEATURE | OBJECT INFORMATION |
|---|---|---|---|
| (X1, Y1, Z1) | (A1°, B1°) | FEATURE 1 | TIGER BUILDING |
| | | FEATURE 2 | SIMON BUILDING |
| (X2, Y2, Z2) | (A2°, B2°) | FEATURE 3 | CATHY BUILDING |
| | | | LION BUILDING |
| (X3, Y3, Z3) | (A4°, B4°) | FEATURE 5 | INDOOR MAP |
| ... | ... | ... | ... |

500

*FIG. 5* ically, to providing real-time information on objects in an image captured by the wearable computer.

BACKGROUND

In recent years, mobile devices have become popular among users. These devices often provide various functions such as data communication capabilities over a wireless network, image capturing capabilities through the use of a camera, and so forth. Due to their portability, users typically carry the devices with them most of the time.

More recently, various types of mobile devices that can be worn by a user have been introduced. One such type of mobile devices is a computer implemented in eyeglasses. Such mobile devices generally include a pair of conventional optical lenses and a display screen for displaying data or information. As such, users may view a current scene through the lenses while having access to data or information displayed on the display screen.

Such mobile devices generally include a camera to capture an image and may provide a user with an identification of an object in the image. However, such devices may not be able to provide more meaningful information on objects that can be helpful to users. For example, such devices may not be able to accurately identify or determine a specific location of an object from a captured image. And even if the object is identified, for example, by its name, such identification may not be particularly helpful to the user.

SUMMARY

The present disclosure relates to providing object information on at least one object in a scene for output to a wearable computer based on a current location of the wearable computer, a view direction of an image sensor, and at least one feature for the object.

According to one aspect of the present disclosure, a method for providing object information for a scene in a wearable computer is disclosed. In this method, an image of the scene is captured. Further, the method includes determining a current location of the wearable computer and a view direction of an image sensor of the wearable computer and extracting at least one feature from the image indicative of at least one object. Based on the current location, the view direction, and the at least one feature, information on the at least one object is determined. Then, the determined information is output. This disclosure also describes apparatus, a device, a system, a combination of means, and a computer-readable medium relating to this method.

According to another aspect of the present disclosure, a wearable computer includes an image sensor, a location determining unit, a direction determining unit, a feature extracting unit, an object information generator, and an output unit. The image sensor is configured to capture an image of the scene. The location determining unit is configured to determine a current location of the wearable computer. The direction determining unit is configured to determine a view direction of the image sensor of the wearable computer. The feature extracting unit is configured to extract at least one feature from the image indicative of at least one object. The object information generator is configured to determine information on the at least one object based on the current location, the view direction, and the at least one feature. The output unit is configured to output the determined information.

BRIEF DESCRIPTION OF THE DRAWINGS

Embodiments of the inventive aspects of this disclosure will be understood with reference to the following detailed description, when read in conjunction with the accompanying drawings.

FIG. 5 illustrates an exemplary object database that may be used to determine information on an object located in a view direction as viewed from a reference location based on a predetermined feature indicative of the object, according to one embodiment of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
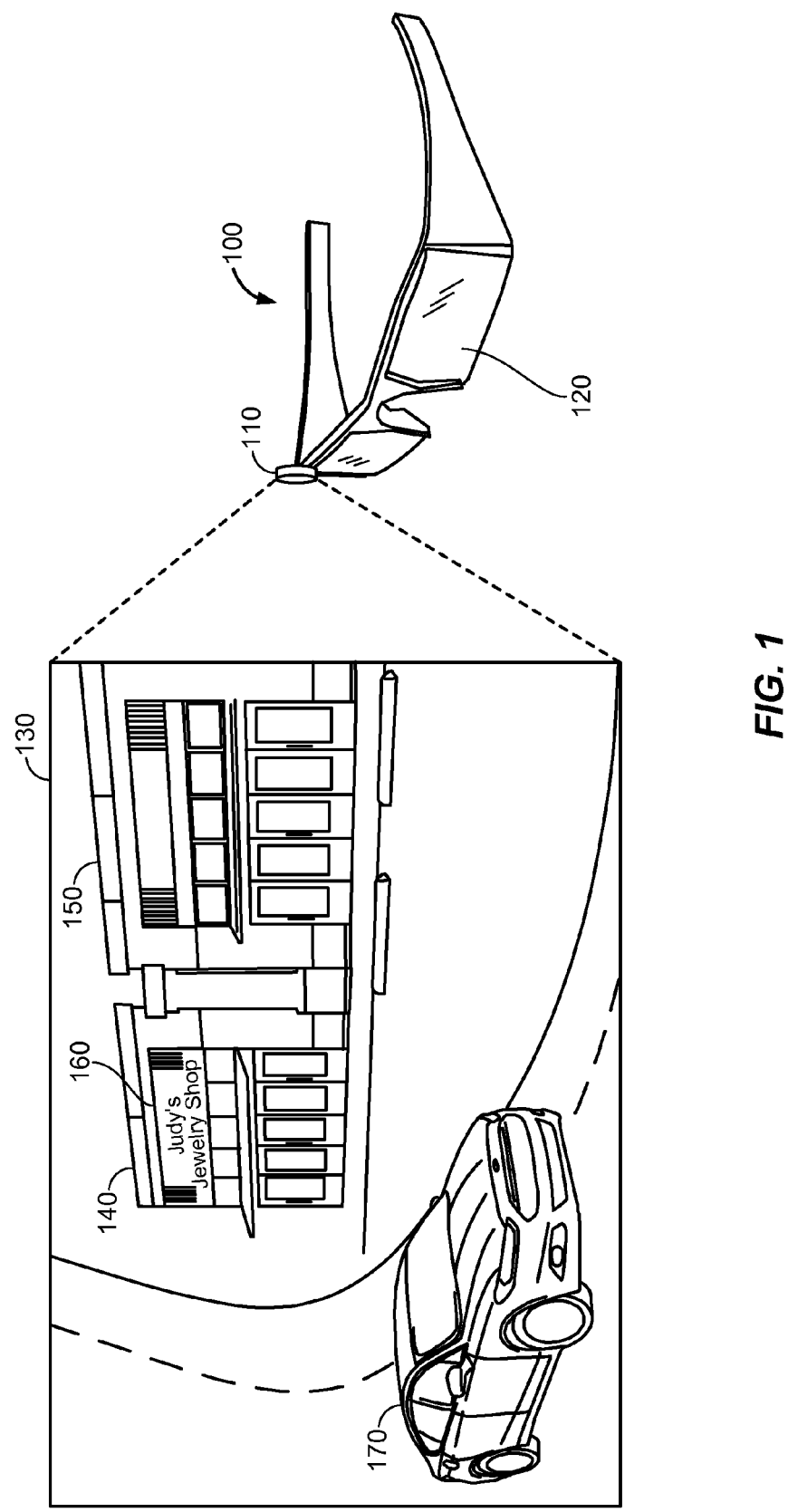
FIG. 1 illustrates a wearable computer including an image sensor configured to capture an image of a scene in real-time according to one embodiment of the present disclosure.

FIG. 1 illustrates a wearable computer 100 including an image sensor 110 for capturing an image of a current scene 130 being viewed by a user (not shown) through optical lenses 120 of the wearable computer 100, according to one embodiment of the present disclosure. In the illustrated embodiment, the wearable computer 100 is eye glasses but may include any suitable computing devices equipped with an image capturing device that can be worn by a user or disposed on the body of the user. For example, the wearable computer 100 may be located on any part of the glasses, including a frame portion of the glasses, such as temple arms, an endpiece, a bridge, etc. The user of the wearable computer 100 may see the current scene 130 through the lenses 120 in the same manner as conventional optical lenses. As shown, the current scene 130 viewed through the lenses 120 may include a plurality of objects such as a plurality of buildings 140 and 150, a signboard 160 with the text "Judy's Jewelry Shop" in the building 140, and a car 170 on a road.

The wearable computer 100 may be configured to capture scenes continuously in real-time. For example, the current scene 130 illustrated in FIG. 1 may be captured by the image sensor 110 of the wearable computer 100 at a specified point in time. In real time operation, the wearable computer 100 may then capture a plurality of scenes that are within a field of view of the image sensor 110 according to a movement of the user. As each image of the scenes is captured, a location of the wearable computer 100 and a view direction of the image sensor 110 are determined for processing the image. The view direction of the image sensor 110 (e.g., one or more cameras) may indicate a direction of view from one or more optical elements (e.g., one or more lenses) in the image sensor 110. Although the wearable computer 100 is shown with one image sensor 110, it may include any number of image sensors for capturing a current scene. In this case, the image sensors may be arranged at any suitable locations on the wearable computer 100. As used herein, the term "capture" or "capturing" may indicate receiving or generating an image of a scene and may include an operation of sensing, detecting, or recording the image.

Figure 2:
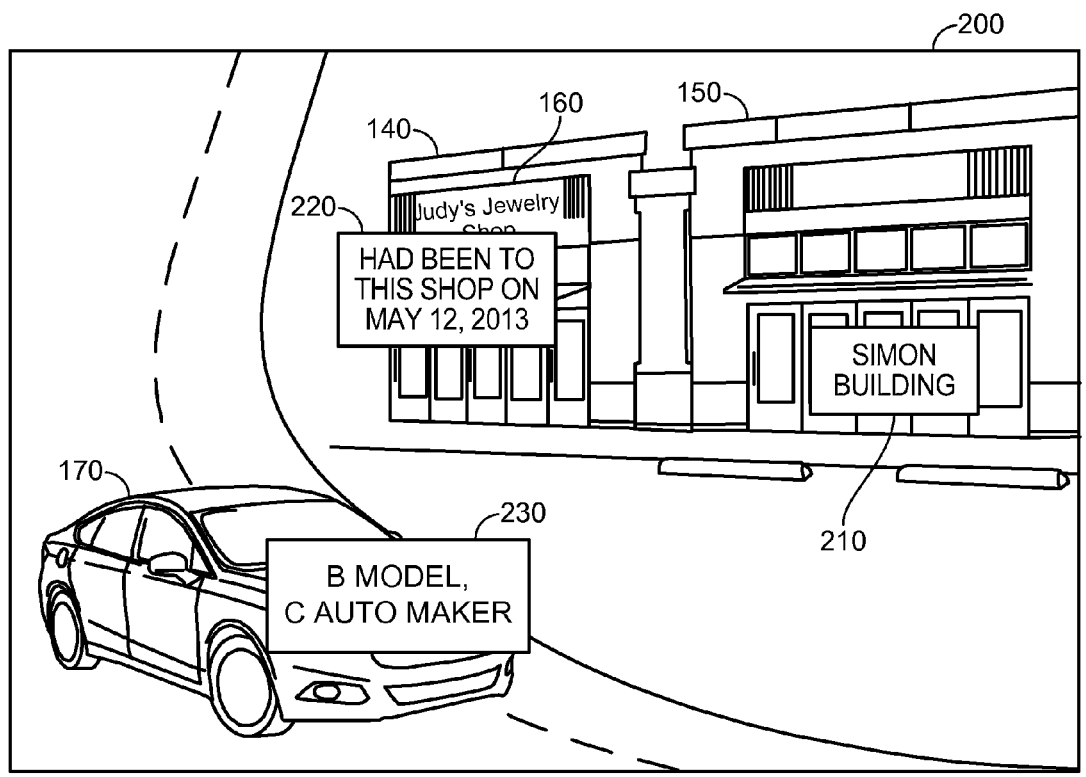
FIG. 2 depicts a view of the scene seen through the lenses by a user of the wearable computer and an image of object information displayed on the lenses for the scene, according to one embodiment of the present disclosure.

After capturing the current scene 130, the wearable computer 100 analyzes the captured image to display information relating to at least one of the objects 140 to 170 in the current scene 130. FIG. 2 depicts a view 200 of the scene 130 seen through the lenses 120 by a user of the wearable computer 100, and images of object information items 210, 220, and 230 superimposed over the scene 130 and displayed on the lenses 120, according to one embodiment of the present disclosure. As used herein, the term "object information" refers to any information describing or relating to an object and may include any one or combination of text, an image, and a sound. For example, object information may include information such as a name of an object, a brand of the object, characteristics of the object, and historical data relating to the object.

The wearable computer 100 is configured to detect the objects 140, 150, 160, and 170 in the captured image of the scene 130 by performing a boundary detection. In this process, the captured image is segmented into a plurality of boundaries for the objects 140 to 170. For generating information on the detected objects 140 to 170, the wearable computer 100 extracts at least one feature for each of the objects 140 to 170. Based on the features extracted from the captured image along with the location of the wearable computer 100 and the view direction of the image sensor 110 associated with the image, the wearable computer 100 determines information on the objects 140 to 170 in the scene 130. For example, the information on the objects 140 to 170 may be determined as information items "TIGER BUILDING" for the building 140, "SIMON BUILDING" for the building 150, "HAD BEEN TO THIS SHOP ON May 12, 2013" for the signboard 160, and "B MODEL, C AUTOMAKER" for the car 170. The object information may then be output on the wearable computer 100 for the user. As used herein, the term "information" may refer to a piece or item of information in a singular or plural form, and is used interchangeably with a term "information item" or any variations thereof.

In some embodiments, the wearable computer 100 may select object information items among the information items determined for the objects 140 to 170 for output based on priority data indicative of the user's preference or history of use. As illustrated, the object information items "SIMON BUILDING" 210 for the building 150, "HAD BEEN TO THIS SHOP ON May 12, 2013" 220 for the signboard 160, and "B MODEL, C AUTOMAKER" 230 for the car 170 are selected based on the priority data. The selected object information items are then superimposed and displayed over the scene 130 (as seen in the view 200) on the lenses 120 to provide information that may be useful for the user. Alternatively, the wearable computer 100 may include a display unit disposed at least partially over either or both of the lenses 120 to display the object information items. In another embodiment, the object information items may be converted into sound using any suitable text-to-speech technology, and played through a speaker on the wearable computer 100.

In displaying object information items, the wearable computer 100 may magnify the information items 210 to 230 or overlap the information items 210 to 230 with associated objects 150 to 170. Alternatively, such object information items may be displayed in the vicinity of the associated objects. Further, such object information items may be output on a mobile device of the user that is in communication with the wearable computer 100 using any suitable wireless communication technologies such as Wi-Fi Direct, Bluetooth, FlashLinq, NFC (near field communication), infrared communication technology, and the like. Although the wearable computer 100 is illustrated with the optical lenses 120, it will be appreciated that the optical lenses 120 are optional and the wearable computer 100 may be implemented with one or more display screens arranged at any suitable locations in the wearable computer 100 with or without such lenses to provide object information for a current view.

Figure 3:
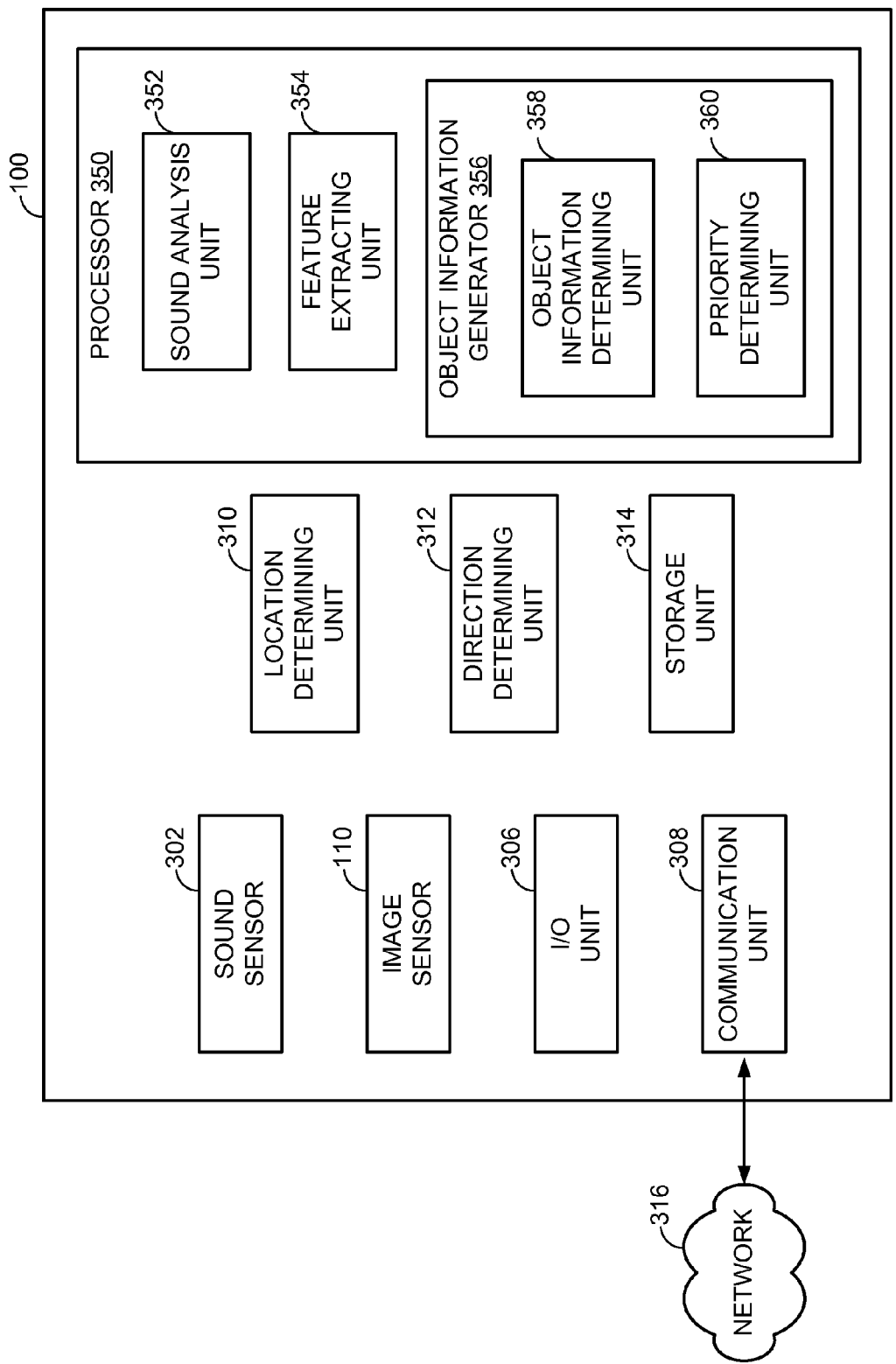
FIG. 3 is a block diagram of the wearable computer configured to provide object information for a captured scene in real-time, according to one embodiment of the present disclosure.

FIG. 3 is a block diagram of the wearable computer 100 configured to capture a scene including a plurality of objects and generate information on the objects for output, according to one embodiment of the present disclosure. The wearable computer 100 includes a sound sensor 302, the image sensor 110, an I/O (input/output) unit 306, a communication unit 308, a location determining unit 310, a direction determining unit 312, a storage unit 314, and a processor 350. In the illustrated embodiment, the processor 350 includes a sound analysis unit 352, a feature extracting unit 354, and an object information generator 356. The processor 350 may be implemented using any suitable processing unit such as a standardized processor, a specialized processor, a microprocessor, or the like that may execute instructions, e.g., instructions for analyzing and/or processing sound or images, extracting features from the sound or images, and generating object information based on the extracted features.

The image sensor 110 in the wearable computer 100 is configured to capture in real-time a plurality of images of scenes, each of which may include one or more objects. As used herein, the term "in real-time" may also refer to substantially in real-time. The image sensor 110 may include at least one camera for capturing scenes within the field of view of the image sensor 110. Scenes in various distances from the image sensor 110 may be captured by dynamically adjusting a focal length of a lens in the image sensor 110. In addition, the image sensor 110 can be positioned on any part of the glasses for capturing scenes in various view directions, and may include a lens that can focus in a plurality of directions. As each scene is captured, the image sensor 110 provides the captured image to the feature extracting unit 354 in the processor 350.

The location determining unit 310 in the wearable computer 100 is configured to determine a current location of the wearable computer 100 worn by the user and keep track of subsequent locations of the wearable computer 100 according to a movement of the user. When an image of a scene is captured, the location determining unit 310 provides a location of the wearable computer 100 corresponding to the captured image to the object information generator 356. In determining the location of the wearable computer 100, the location determining unit 310 may receive and use global positioning system (GPS) location information if the information is available (e.g., in an outdoor setting). If GPS information is not available (e.g., in an indoor setting), the location determining unit 310 may receive signals from Wi-Fi access points or cell tower base stations and determine the location of the wearable computer 100 based on the intensity of each of the received signals and/or using any suitable triangulation method. The location may include a set of latitude, longitude, and altitude, or a combination thereof, of the wearable computer 100.

The direction determining unit 312 in the wearable computer 100 is configured to determine a view direction of the image sensor 110. In one embodiment, the direction determining unit 312 includes a gyroscope and/or an accelerometer to determine the view direction of the image sensor 110. The view direction may be determined as an angle with respect to a reference direction such as north, south, east, or west. The view direction may also include an angle with respect to a reference horizontal plane. The direction determining unit 312 then provides the view direction to the object information generator 356.

The feature extracting unit 354 in the processor 350 is configured to receive the captured image from the image sensor 110 and extract at least one feature for each object detected in the captured image of the scene. In one embodiment, the feature extracting unit 354 is configured to segment the captured image into a plurality of boundaries to detect the objects in the captured image. In this case, each of the segmented portions may be associated with each of the objects. For segmentation of the captured image, the feature extracting unit 354 may use any suitable image segmentation method, such as a histogram-based method, an edge detection method, a region-growing method, a split and merge method, a multi-scale method, or the like. After detecting the objects in the captured image, the feature extracting unit 354 may extract the features for the detected objects using any suitable image processing techniques, such as an object recognition method, an OCR (Optical Character Recognition) technique, a facial recognition technique, a barcode recognition technique, a QR code recognition technique, and the like. In one embodiment, if a plurality of features is extracted for each detected object, the extracted features may be represented as a combination of the plurality of feature values (e.g., a feature vector).

In one embodiment, the feature extracting unit 354 may receive a plurality of images that are captured substantially at the same time by two or more cameras of the image sensor 110. Since the plurality of images is taken at the same time, the images may include substantially the same objects, and thus, analysis of the images may allow determination of distances to the objects (e.g., depth perception). In this case, the feature extracting unit 354 may process the plurality of images collectively as a single image and determine distances of various objects in the images. The distances may be used in segmenting boundaries of the objects in the captured images for detecting the objects.

The feature extracting unit 354 may also determine a location of each of the objects in the captured image when detecting each of the objects by segmentation of the captured image. For example, the location of an object may include a two-dimensional coordinate in the captured image. The extracted feature and the location for each of the objects may then be provided to the object information generator 356.

The wearable computer 100 includes the storage unit 314 for storing an object database from which object information can be retrieved. The object database includes a set of extracted features, locations, view directions associated with objects, and information on the objects. The object database is described in more detail with reference to FIG. 5 below. The storage unit 314 may also store a context information database that may be used in determining priority data for selecting one or more object information items to be output. The context information database may include a text message database, an image database, a speech database, a location database, and a web search query database, as is described in more detail with reference to FIG. 10. The storage unit 314 may be implemented using suitable storage or memory device such as a RAM (Random Access Memory), a ROM (Read Only Memory), an EEPROM (Electrically Erasable Programmable Read Only Memory), a flash memory, etc.

The sound sensor 302 is configured to receive an input sound (e.g., speech command of a user) and provide the sound to the sound analysis unit 352. The sound sensor 302 may include one or more microphones or any other types of sound sensors that can be used to receive, capture, sense, and/or detect a sound as an input to the wearable computer 100. The sound analysis unit 352 is configured to extract a plurality of sound features from the input sound and detect one or more keywords in the input sound. The detected keywords may be provided as an input (e.g., a destination, a favorite restaurant, etc.) to the object information generator 356 for selectively outputting object information. Additionally or alternatively, the detected keywords may be provided to the storage unit 314 for updating the speech database with the detected keywords.

The object information generator 356 includes an object information determining unit 358 and a priority determining unit 360. The object information determining unit 358 receives a current location of the wearable computer 100 from the location determining unit 310, a view direction of the image sensor 110 from the direction determining unit 312, and at least one feature for each object detected in the feature extracting unit 354. In one embodiment, the object information determining unit 358 may determine information on each of the objects appearing in a captured image of a current scene based on the location, the view direction, and the extracted feature for each of the objects. In this process, the object information determining unit 358 may access the object database in the storage unit 314. If the object information is not located in the object database, the object information generator 356 may access a mobile device of the user and/or an external server via the communication unit 308 through a network 316 (e.g., a wireless communication network such as WiFi, Bluetooth, etc.) to retrieve the object information.

The object information determining unit 358 may determine a variety of information on objects such as names of the objects, brands of the objects, characteristics of the objects, surrounding information on the objects, and inside information on the objects, etc. For example, information on a building or a structure occluded, at least in part or total, by another building or structure in a captured image of a scene may be accessed and output on the wearable computer 100. In this case, at least one extracted feature for the occluding object may be stored in the object database, in association with the information on the occluded object. As such, the object information determining unit 358 may retrieve the information on the occluded object from the object database, based on the extracted feature for the occluding object. In another example, the object information generator 356 may determine information on an indoor layout of an object (e.g., a building) captured in an image based on an extracted feature for the captured object. Upon determining the information for the detected objects, the object information generator 356 provides the information to the priority determining unit 360.

The priority determining unit 360 receives a location for each detected object from the feature extracting unit 354 and object information (or object information items) from the object information determining unit 358. In one embodiment, the priority determining unit 360 determines a priority for the detected objects by accessing the context information database in the storage unit 314. The priority is indicative of the user's interest or preference, and may be determined based on at least one of user's past inputs and historical data stored in the wearable computer 100 or a mobile device of the user. Among the information items on a plurality of objects, the priority determining unit 360 may select at least one information item on at least one object based on the priority. The selected object information item is then displayed on the lenses 120 based on the received location for each object.

In one embodiment, the object information generator 356 may generate an image of the selected object information item to display the object information item by superimposing the information item with the associated object or providing the information item in the vicinity of the associated object based on the location for the associated object, as described in detail with reference to FIG. 11. If an object in the captured image is determined to be distant from the wearable computer 100 based on a location for the object in the captured image, the information item for the object may be displayed in a size adapted to compensate for the distance. In another embodiment, the object information generator 356 may generate an output sound for the selected object information item by text-to-speech conversion and/or image-to-text conversion, if the object information item is in a text or image format. The generated image and/or the output sound of the object information item may then be provided to the I/O unit 306 for output.

The I/O unit 306 is configured to receive the generated image and/or the output sound from the object information generator 356. The I/O unit 306 may include a display unit for displaying the generated image and a speaker for outputting the generated sound. The display unit may be any suitable electronic visual display including LCD (Liquid Crystal Display), LED (Light Emitting Diode), etc. to output the object information. In displaying the generated image on the display unit, the generated image is superimposed over the scene being viewed by the user of the wearable computer 100. Accordingly, the wearable computer 100 may provide, in real-time, useful information on a plurality of objects in the scene being viewed by the user. In addition, the I/O unit 306 may include any other suitable input or output devices for receiving user inputs or outputting information on the wearable computer 100.

Figure 4:
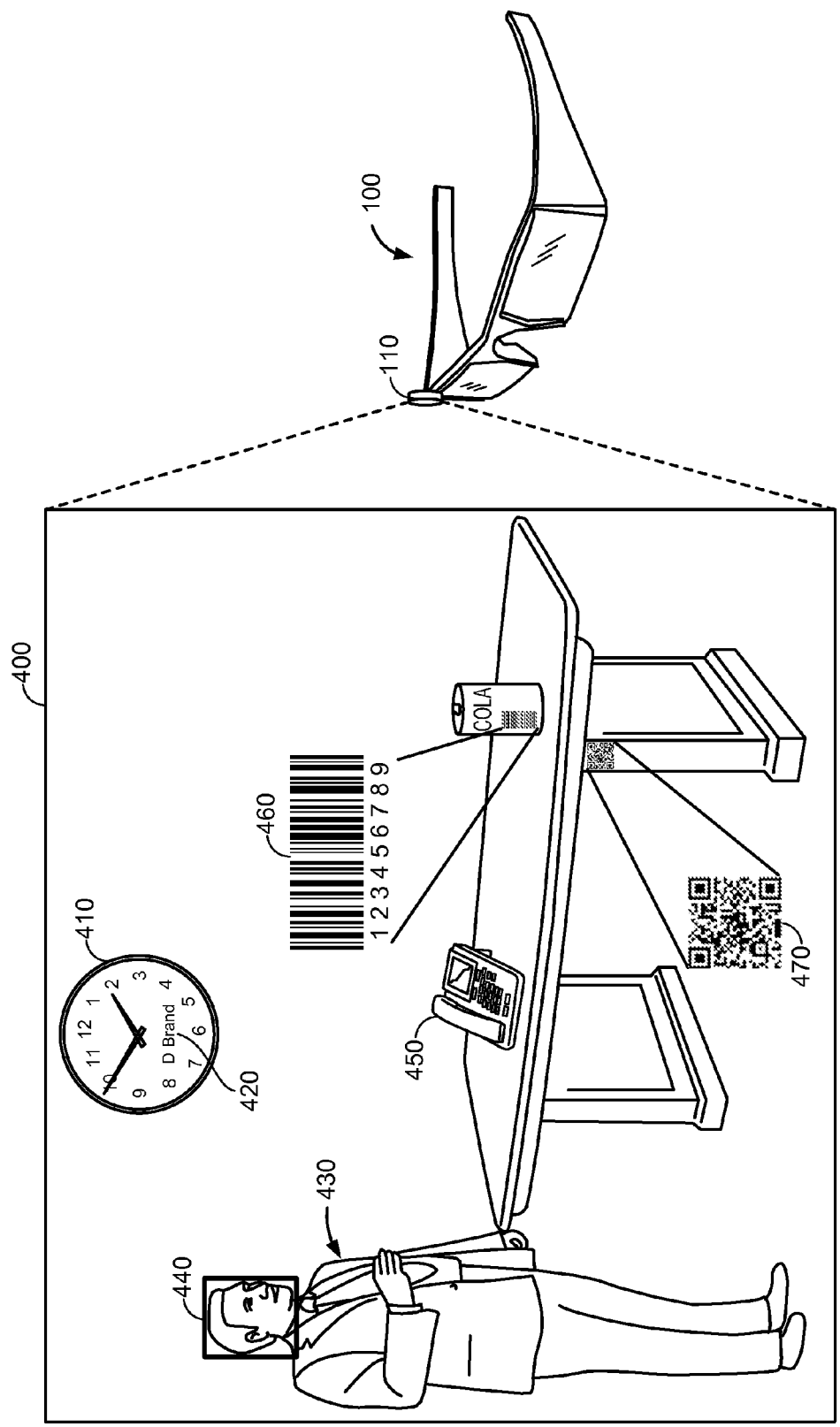
FIG. 4 shows an image of an office scene in which a plurality of objects is located as captured by the image sensor of the wearable computer, according to one embodiment of the present disclosure.

FIG. 4 shows an image 400 of an office scene in which a plurality of objects 410, 420, 430, 440, 450, 460, and 470 is located as captured by the image sensor 110 of the wearable computer 100, according to one embodiment of the present disclosure. The feature extracting unit 354 receives the captured image 400 from the image sensor 110 and extracts at least one feature from each of the objects 410 to 470 in the captured image. In this process, the captured image may be segmented into a plurality of boundaries that can be used to detect the objects 410 to 470.

When the objects 410 to 470 have been detected by segmentation, the feature extracting unit 354 may extract at least one feature from each of the objects 410 to 470 for recognizing the objects 410 to 470 by using suitable object recognition techniques. For example, the feature extracting unit 354 may extract at least one feature for the object 410, which is a clock, using an object recognition technique. On the other hand, at least one feature for the object 420, which is text "D brand," in the object 410 (i.e., the clock) may be extracted based on an OCR technique. For the object 450 (i.e., a telephone), the feature extracting unit 354 may also extract at least one feature for the object 450 using the object recognition technique. In the case of the object 430 (i.e., a person) in the image 400, the feature extracting unit 354 may perform a facial recognition analysis on the object 440, which is a face of the object 430, to extract at least one facial feature. For the objects 460 and 470, which are a barcode on a soda can and a QR code on a desk, respectively, at least one feature from each of the objects 460 and 470 may be extracted based on a barcode recognition method and a QR code recognition method, respectively.

The extracted features for the objects 410 to 470 are then provided to the object information generator 356 for determining information related to the objects 410 to 470. For example, in the case of the object 410 (i.e., the clock), the object 420 is the text "D Brand" and describes the clock. Accordingly, the object information generator 356 may determine information on the object 410 based on the extracted features of the objects 410 and 420. For the object 440, information (e.g., a name, a job title, an address, etc.) on the person associated with the object 430 may be obtained by searching and retrieving object information on the person from an object database based on the extracted facial features. In the case of the barcode and QR code objects 460 and 470, the extracted features may be provided to the object information generator 356 for determining object information on a soda can having the barcode and a desk with the QR code. As a barcode or a QR code for an object typically serves as a unique identifier for an object, a current location of the wearable computer 100 and/or a view direction of the image sensor 110 may not be needed in determining information on objects with a barcode or a QR code in some embodiments.

FIG. 5 illustrates an exemplary object database 500 that may be used to determine information on a plurality of objects according to one embodiment of the present disclosure. The object database 500 may include a plurality of locations, a plurality of view directions, a plurality of predetermined features, and object information for the features. As illustrated, the object database 500 may map at least one feature of each object, which is located in an image as viewed from a specified location in a specified view direction, to object information. Accordingly, the object information generator 356 may determine object information from the object database 500 based on a location, a view direction, and at least one feature. In one embodiment, the object database 500 may include the plurality of predetermined features mapped to at least one of the plurality of locations, the plurality of view directions, and information on the plurality of objects. Each of the features in the object database 500 may include at least one feature for an object or, in the case of an object having a plurality of features, a feature vector representing the combination of the plurality of features.

In the illustrated object database 500, each of the locations is stored as a set of three coordinates representing latitude, longitude, and altitude. In addition, each of the view directions in the object database 500 is also stored as a pair of coordinates indicative of an angle with respect to a reference direction, such as a north, south, east, or west, and an angle with respect to a reference horizontal plane. The predetermined features may include a plurality of features for objects such as buildings, landmark structures, faces of persons, QR codes, barcodes, texts, etc. For example, the object database 500 includes "FEATURE 1" and "FEATURE 2," both of which are associated with a location (X1, Y1, Z1) and a view direction (A1°,B1°), mapped to object information "TIGER BUILDING" and "SIMON BUILING," respectively.

In one embodiment, information on an object includes a plurality of information items associated with the object. In this case, some of the information items may indicate surrounding information on the object (e.g., information on an occluded building). For example, the object database 500 includes "CATHY BUILDING" and "LION BUILDING" stored in association with a location (X2, Y2, Z2), a view direction (A2°, B2°), and a feature "FEATURE 3."

The object database 500 may be generated and stored in the wearable computer 100. Alternatively, the object database 500 may be stored in a mobile device of the user or an external server, and may be accessed by the wearable computer 100 for obtaining information on the objects. For each of the objects, the object database 500 may be implemented as a lookup table or any other data structure that can associate predetermined features with locations, view directions, and object information.

Figure 6:
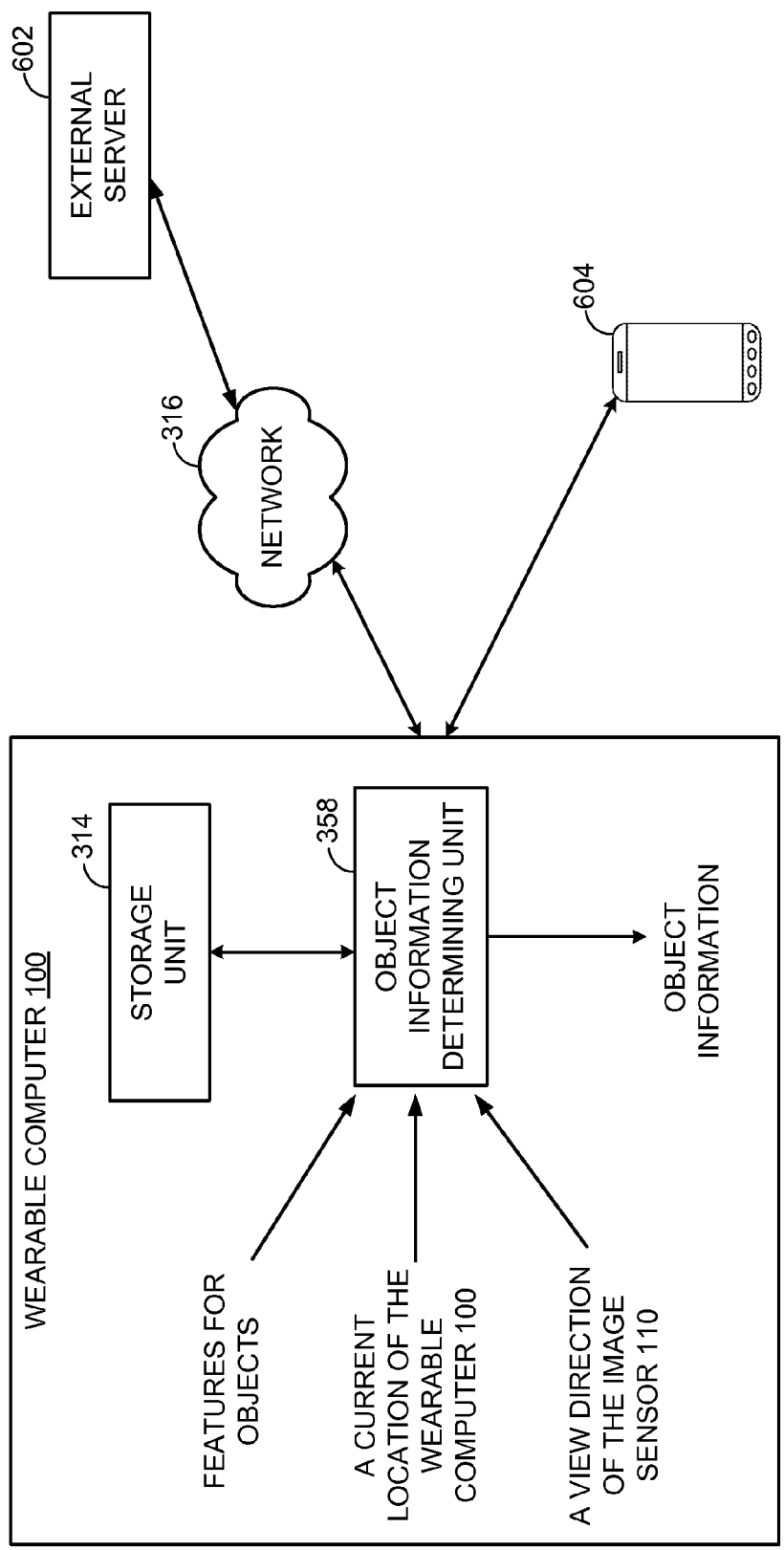
FIG. 6 depicts a block diagram of an object information determining unit in the wearable computer that is configured to determine object information based on a location of a wearable computer, a view direction of an image sensor, and at least one feature for an object, according to one embodiment of the present disclosure.

FIG. 6 depicts a block diagram of the object information determining unit 358 in the wearable computer 100 that is configured to determine information on a plurality of objects in a captured scene, according to one embodiment of the present disclosure. The object information determining unit 358 is configured to receive a current location of the wearable computer 100 from the location determining unit 310, a view direction of the image sensor 110 from the direction determining unit 312, and a plurality of features for the objects from the feature extracting unit 354. The current location, the view direction, and at least one feature for a detected object are used to retrieve information for the object by accessing the object database 500 in the storage unit 314 that includes locations, view directions, predetermined features, and object information, as described in detail above with reference to FIG. 5. For each of the detected objects, the object information determining unit 358 compares the current location, the view direction, and the at least one feature to the locations, the view directions, the predetermined features in the object database 500. If object information is not found in the object database 500 of the storage unit 314, the object information determining unit 358 may determine object information by accessing a mobile device 604 of a user via a short range wireless communication technique (e.g., Bluetooth technology). Alternatively or additionally, an external server 602 including an object database may be accessed through the communication unit 308 via the network 316 to retrieve the object information.

In one embodiment, the object information determining unit 358 may identify a plurality of predetermined features in the object database 500 that correspond to the current location and the view direction of the object features extracted from a captured image. Among the predetermined features, a plurality of candidate features may be selected if a location difference between the current location and each of the locations associated with the candidate features is within a predetermined threshold. In selecting the candidate features, the object information generator 356 may also determine if a view difference between the view direction and each of the view directions associated with the candidate features is within a predetermined threshold.

Among the candidate features, the object information determining unit 358 may identify at least one candidate feature that corresponds to the at least one extracted feature for each object. Based on the identified feature, the object information determining unit 358 may retrieve at least one object information item associated with the identified feature. In one embodiment, if a candidate feature is not identified, a new image of a scene including the object, for which the candidate feature has not been identified, may be captured by adjusting a focal length of a lens in the image sensor 110. In this process, a view direction of the lens may also be changed to capture the object in the new image. From the new image, the feature extracting unit 354 may extract at least one new feature for the object. Based on the extracted new feature, the object information determining unit 358 may select one of the candidate features that corresponds to the new feature and retrieve at least one object information item associated with the selected candidate feature. The retrieved information items for the detected objects may then be provided to the priority determining unit 360 for selecting at least one of the object information items for output, as described in detail with reference to FIG. 13 below.

Figure 7:
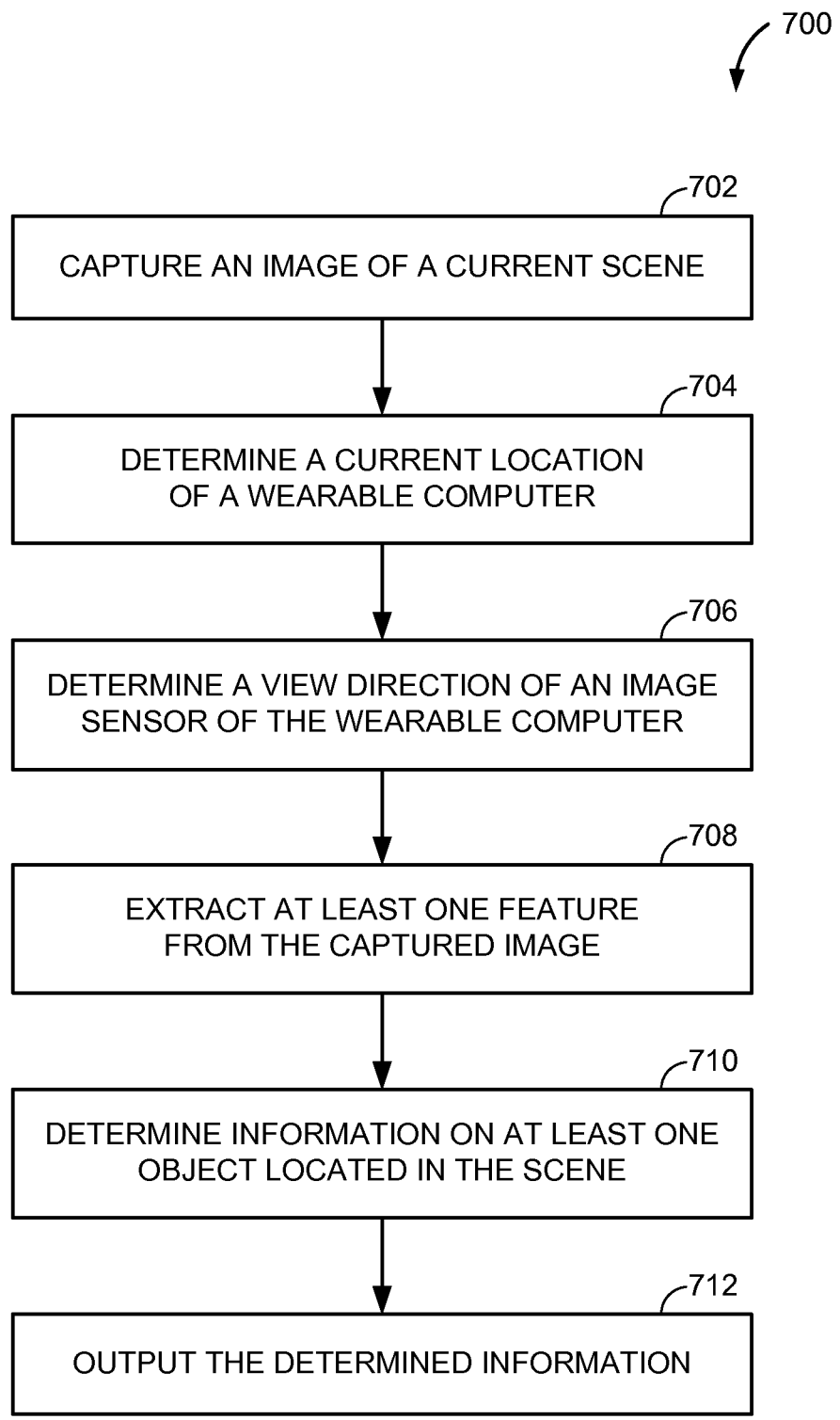
FIG. 7 shows a flowchart of a method of determining information on at least one object in a scene for output to the wearable computer, according to one embodiment of the present disclosure.

FIG. 7 shows a flowchart of a method 700 performed in the wearable computer 100 for determining information on a plurality of objects in a current scene being viewed by a user for output to the wearable computer 100 in real-time, according to one embodiment of the present disclosure. Initially, the image sensor 110 captures an image of the current scene including at least one object, at 702. When the image is captured, the location determining unit 310 determines a current location of the wearable computer 100 and a view direction of the image sensor 110, at 704 and 706.

From the captured image, the feature extracting unit 354 extracts at least one feature for each object in the scene, at 708. In this process, the feature extracting unit 354 detects the objects by segmenting the captured image into a plurality of boundaries for the objects. At 710, the object information determining unit 358 determines information on the at least one object based on the current location, the view direction, the at least one features. The determined information is output on the wearable computer, at 712.

Figure 8:
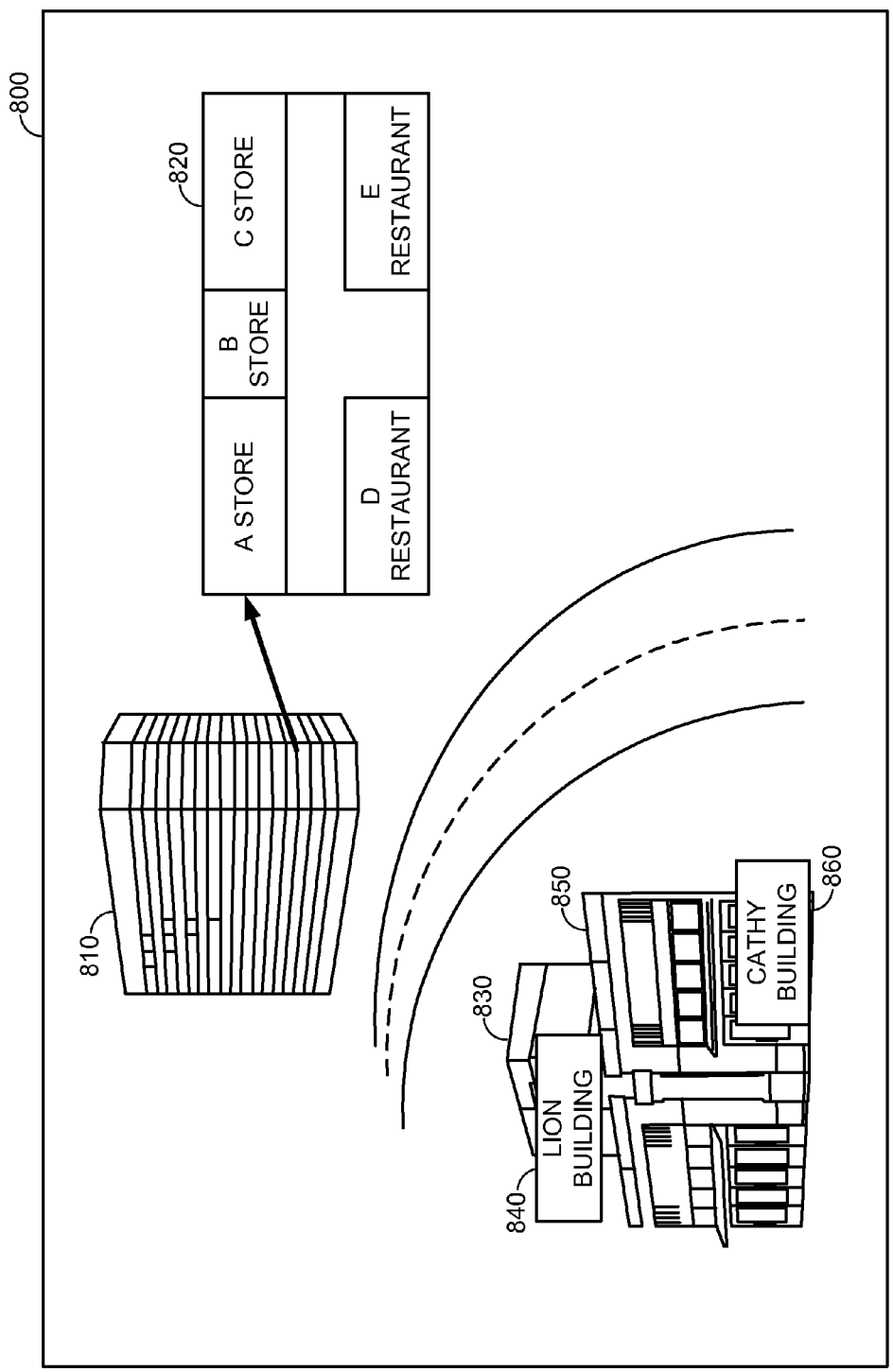
FIG. 8 is a view of the scene of a street seen through the lenses by a user of the wearable computer and an image of object information displayed on the lenses for the street scene, according to one embodiment of the present disclosure.

FIG. 8 is a view 800 of a street scene as seen through the lenses 120 of the wearable computer 100 by a user and an image of object information items 820, 840, and 860 displayed on the lenses 120 for the street scene, according to one embodiment of the present disclosure. The wearable computer 100 initially captures an image of the street scene through the image sensor 110 and detects a shopping mall 810 and a plurality of buildings 830 and 850 in the captured image. In the illustrated scene, since the building 830 is partially occluded by the building 850, the feature extracting unit 354 may extract one or more features for the building 850 without extracting a feature for the occluded building 830. In this case, an object information item "LION BUILDING" 840 for the occluded building 830 may be stored in the object database 500 as additional object information item for the feature associated with the occluding building 850. In this manner, the object information determining unit 358 may determine the object information item for the occluded building 830 along with an object information item "CATHY BUILDING" for the occluding building 850 by accessing the object information items on the occluding building 850 in the object database 500.

According to one embodiment, the object information determining unit 358 may provide an indoor map or layout of the shopping mall 810 detected in the captured image. In this case, the object database 500 is configured to include an image of an indoor map or layout of the shopping mall 810 along with a location, a view direction, and one or more features for the shopping mall 810. When at least one extracted feature of the shopping mall 810 is received, the object information determining unit 358 may retrieve the indoor map image for the shopping mall 810 from the object database 500 as an object information item 820 for the shopping mall 810.

The object information items for the shopping mall 810, the occluded building 830, and the occluding building 850 may then be displayed on the wearable computer 100. In one embodiment, the object information items for the shopping mall 810, the occluded building 830, and the occluding building 850 are displayed on the lenses 120 to at least partially overlap the shopping mall 810, the buildings 830 and 850 as viewed by the user through the lenses 120. Alternatively, the object information items may be displayed in the vicinity of the shopping mall 810 and the buildings 830 and 850 as viewed by the user through the lenses 120.

Figure 9:
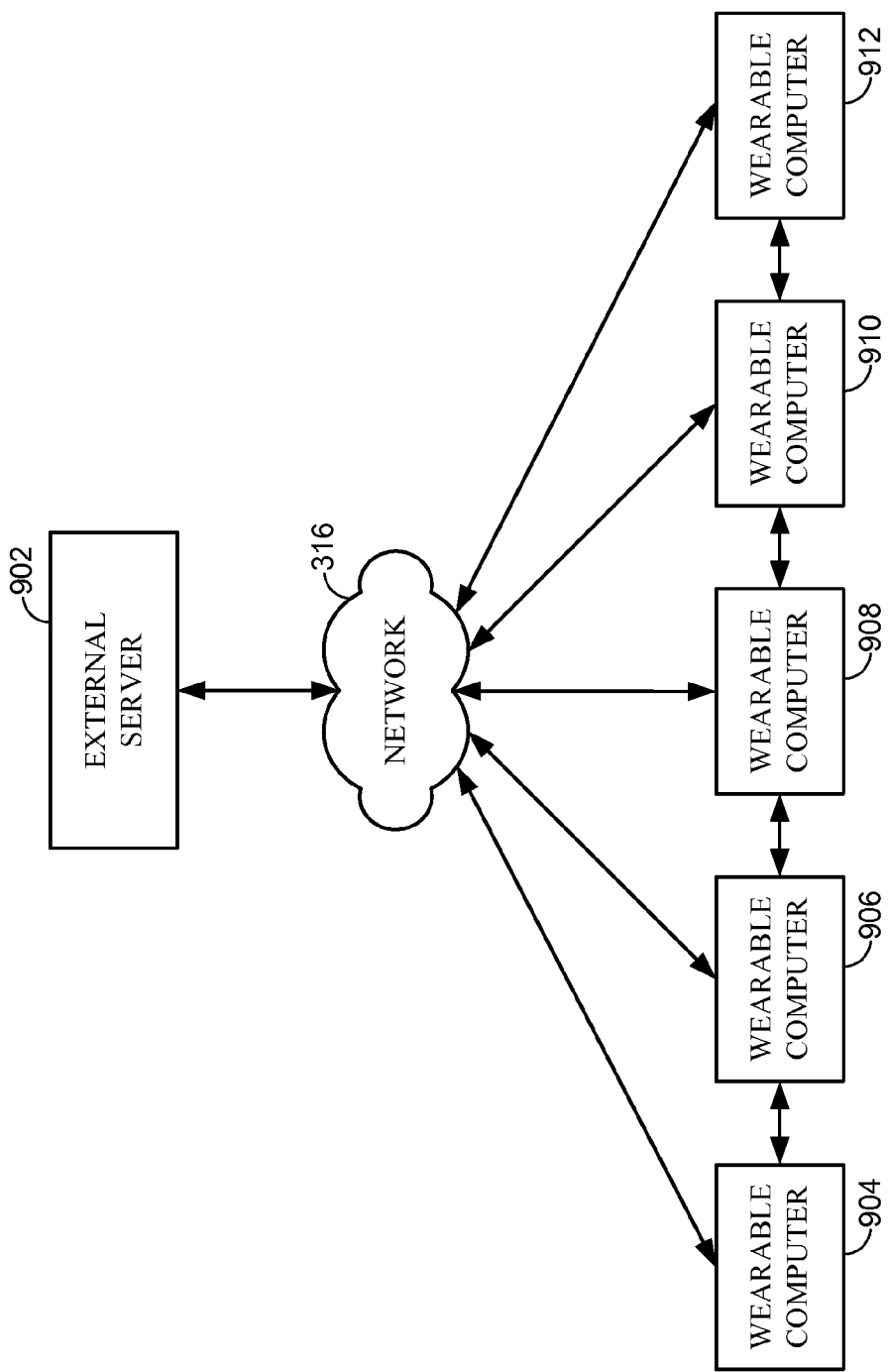
FIG. 9 depicts a server configured to update an object database based on current locations, view directions, features extracted from objects, and information on the objects that are received from a plurality of wearable computers, according to one embodiment of the present disclosure.

FIG. 9 depicts an external server 902 configured to store and update the object database 500 based on current locations, view directions, features extracted from objects, and information on the objects that are received from a plurality of wearable computers 904, 906, 908, 910, and 912, according to one embodiment of the present disclosure. In the illustrated embodiment, each of the wearable computers 904 to 912 includes a similar configuration to the wearable computer 100 as described above. Also, each of the wearable computers 904 to 912 may capture a plurality of images of scenes and extract one or more features for each of a plurality of detected objects in the captured images. In this case, a location and a view direction may be determined for each of the images captured in the wearable computers 904 to 912. Further, information on detected objects associated with the extracted features may be generated based on a user's input on each of the wearable computers 904 to 912 or the user's search queries or results on websites or search engines for an object. In such a case, each wearable computer may transmit the current location, the view direction, the extracted feature, and the generated object information to the external server 902 through the communication network 316.

The external server 902 is configured to receive the current locations, the view directions, the features, and the object information from the wearable computers 904 to 912. The external server 902 then updates the object database 500 with the received locations, view directions, features, and object information, and stores the updated object database 500 in a storage unit. In one embodiment, the external server 902 may update the object database 500 in real-time as locations, view directions, features, and object information are received from the wearable computers 904 to 912, and each of the wearable computers 904, 906, 908, 910, and 912 may access the object database 500 of the external server 902 in real-time.

The wearable computers 904 to 912 may also be configured to communicate with each other to share object databases when the wearable computers 904 to 912 are in close proximity to each other. In this case, each of the wearable computers 904 to 912 may determine the locations of other wearable computers by receiving information on their locations from the external server 902. For example, the external server 902 may keep track of the locations of the wearable computers 904 to 912 by receiving locations of images that are captured by the wearable computers 904 to 912. The wearable computers 904 to 912 may then send or receive an object database, or a portion of the object database relating to a specified geographic region, in communication with each other.

Figure 10:
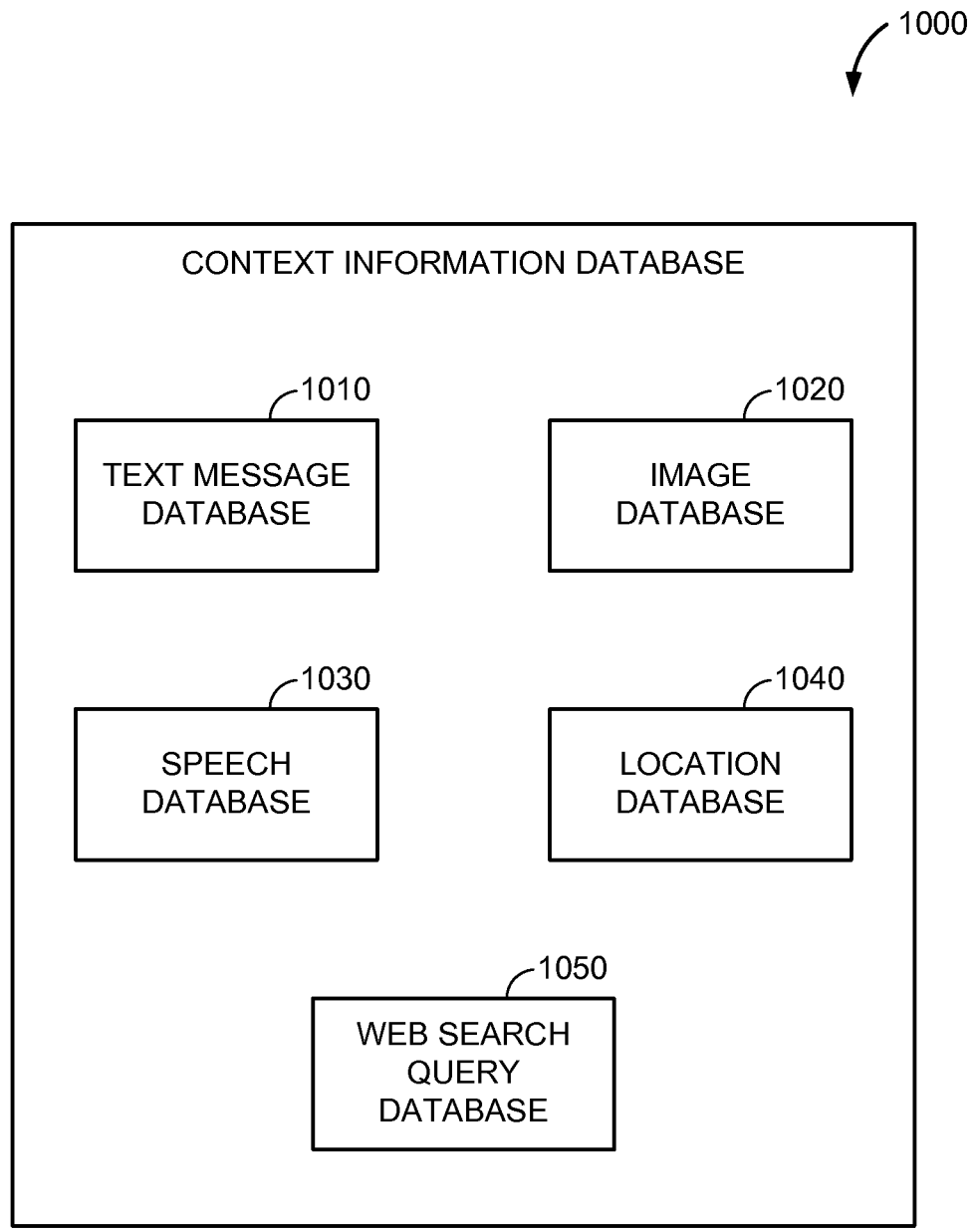
FIG. 10 is a block diagram of a context information database that may be used by a priority determining unit for selecting information items on objects for output on the wearable computer, according to one embodiment of the present disclosure.

FIG. 10 is a block diagram of a context information database 1000 that may be used by the priority determining unit 360 for selecting information items on objects for output on the wearable computer 100, according to one embodiment of the present disclosure. The context information database 1000 includes a text message database 1010, an image database 1020, a speech database 1030, a location database 1040, and a web search query database 1050. The context information database 1000 may be stored in the storage unit 314 of the wearable computer 100 and/or a mobile device of the user that is in communication with the wearable computer 100. The priority determining unit 360 may access any of the databases 1010 to 1050 or any combination thereof to determine priorities for the information items on detected objects and selectively display information on at least one detected object.

In some embodiments, the context information database 1000 includes information or data relating to the user (e.g., user historical data such as user's past input and activities, user created data, etc.) and locations of the wearable computer 100 that can be used to prioritize information items on objects for output on the wearable computer 100. For example, context information such as user data may be generated and stored in the context information database 1000 by recording and analyzing user's past inputs and activities on the wearable computer 100 or the mobile device of the user. In the case of text messages, the text message database 1010 is configured to store a plurality of text messages that have been communicated between the wearable computer 100 or the mobile device of the user and other wearable computers or mobile devices. The text messages in the text message database 1010 may then be accessed in determining priority data for information items on detected objects. For instance, the user may have sent a text message that he or she bought a ring at "Judy's Jewelry Shop." Accordingly, an object information item relating to "Judy's Jewelry Shop" may be prioritized and selected for output on the wearable computer 100.

The image database 1020 of the context information database 1000 is configured to store a plurality of images that have been captured by the wearable computer 100. In one embodiment, a captured image in the image database 1020 is stored with information on the image indicative of one or more objects and/or a location of the captured image. The information on the image may include a name of an object that can be recognized from the captured image using any suitable image processing technique, such as an OCR technique, object recognition technique, etc. The information on the image may also include a location at which the image was generated based on any suitable location tracking techniques, such as GPS tracking. When the priority determining unit 360 receives information items on a plurality of detected objects, it may select at least one object information item that is found in the image database 1020. For example, if the image database 1020 includes an image of a museum, at least one object information item relating to museums may be prioritized and selected for output on the wearable computer 100.

The speech database 1030 includes a plurality of keywords or phrases that have been received from the user and stored in the wearable computer 100 based on speech recognition. When the user speaks a word or a phrase into the sound sensor 302 of the wearable computer 100, the word or phrase is captured and stored in the speech database 1030. In one embodiment, the word or phrase is recognized and stored in a text form to facilitate searching. For example, the user may have recorded a shopping list including "a necklace." In this case, at least one object information item relating to "Judy's Jewelry Shop" may be prioritized and selected for output on the wearable computer 100.

The location database 1040 stores a plurality of past locations for the wearable computer 100. The wearable computer 100 may keep track of its locations using the location determining unit 310 and store the locations in the location database 1040. For example, the wearable computer 100 may store a specified location associated with "Judy's Jewelry Shop," when the user previously visited the shop. Thus, when the shop is one of the objects for which at least one object information item has been generated, the priority determining unit 360 may prioritize "Judy's Jewelry Shop" for output.

The web search query database 1050 may include a plurality of user queries received in a plurality of previous search sessions. In one embodiment, the wearable computer 100 may store user's queries for web search in the web search query database 1050. In another embodiment, the wearable computer 100 may download user's queries that have been used to perform web searches via a search engine from a search provider and store the queries in the web search query database 1050. For example, if the web search query database 1050 has stored a query "baseball park," at least one object information item relating to baseball may be selected for output on the wearable computer 100.

The priority determining unit 360 may search the context information database 1000 and determine priority data for object information items on detected objects received from the object information determining unit 358. In one embodiment, the priority determining unit 360 may determine the priority data by generating a list of context information items from the context information database 1000. The context information items in the list may be arranged according to their priorities such as the number of their occurrences in the database or weights given to the items, or a combination thereof. Based on the priority data, the priority determining unit 360 may prioritize the object information items associated with the detected objects. For example, if the priority data from the context information database 1000 include context information items "car," "sport," and "Lion building" with the most occurrences, the priority determining unit 360 selects at least one information item among the object information items for the detected objects that corresponds to the context information items in the priority data.

Figure 11:
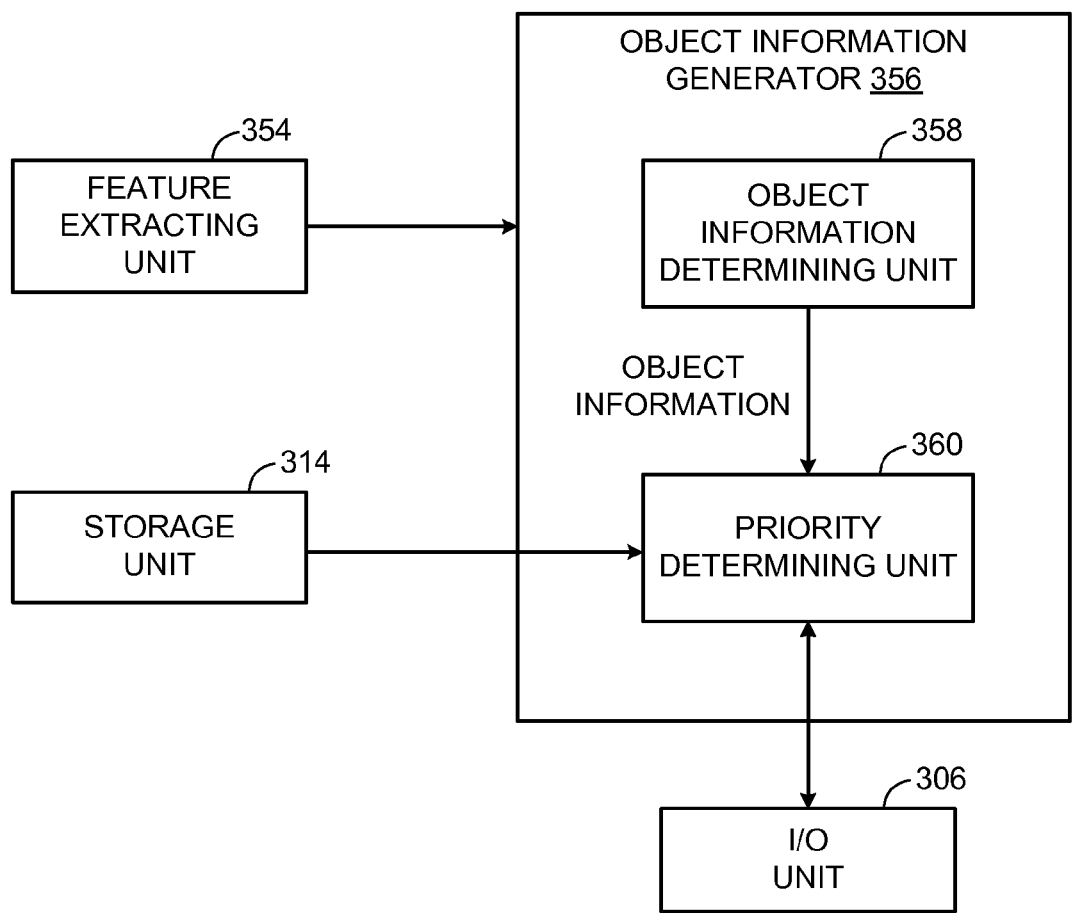
FIG. 11 depicts a block diagram of an object information generator configured to generate and output an image or a sound for object information, according to one embodiment of the present disclosure.

FIG. 11 depicts a block diagram of the object information generator 356 configured to generate and output an image or a sound for object information according to one embodiment. As described above, the object information generator 356 includes the object information determining unit 358 and the priority determining unit 360. The object information determining unit 358 receives extracted features of a captured image from the feature extracting unit 354 and generates information items on a plurality of objects detected in the captured image. The priority determining unit 360 determines priority data from the context information database 1000 in the storage unit 314, as described with reference to FIG. 10 above, and generates an image or a sound for selected object information items based on the priority data.

The priority determining unit 360 may receive a location for each of the detected objects in a captured image from the feature extracting unit 354 and the information items on the detected objects from the object information determining unit 358. The priority determining unit 360 then selects at least one object information item according to the priority data. The selected object information item may then be output through a display screen or a speaker in the I/O unit 306. In the case of displaying the selected object information item, the priority determining unit 360 arranges the selected object information item to be displayed over or in the vicinity of the associated objects detected in the captured image based on their locations.

In one embodiment, the priority determining unit 360 may modify the priority data based on a recently received input from the user. For example, when the user inputs a destination object, the priority determining unit 360 may designate the destination object as the highest priority item in the priority data. If the destination object is detected in the captured image, the priority determining unit 360 selects an information item associated with the detected destination object for output. For example, if the user inputs "seafood restaurant" as the destination object, the seafood restaurant may be given a high priority such that its object information item can be selected and output on the wearable computer 100.

Figure 12:
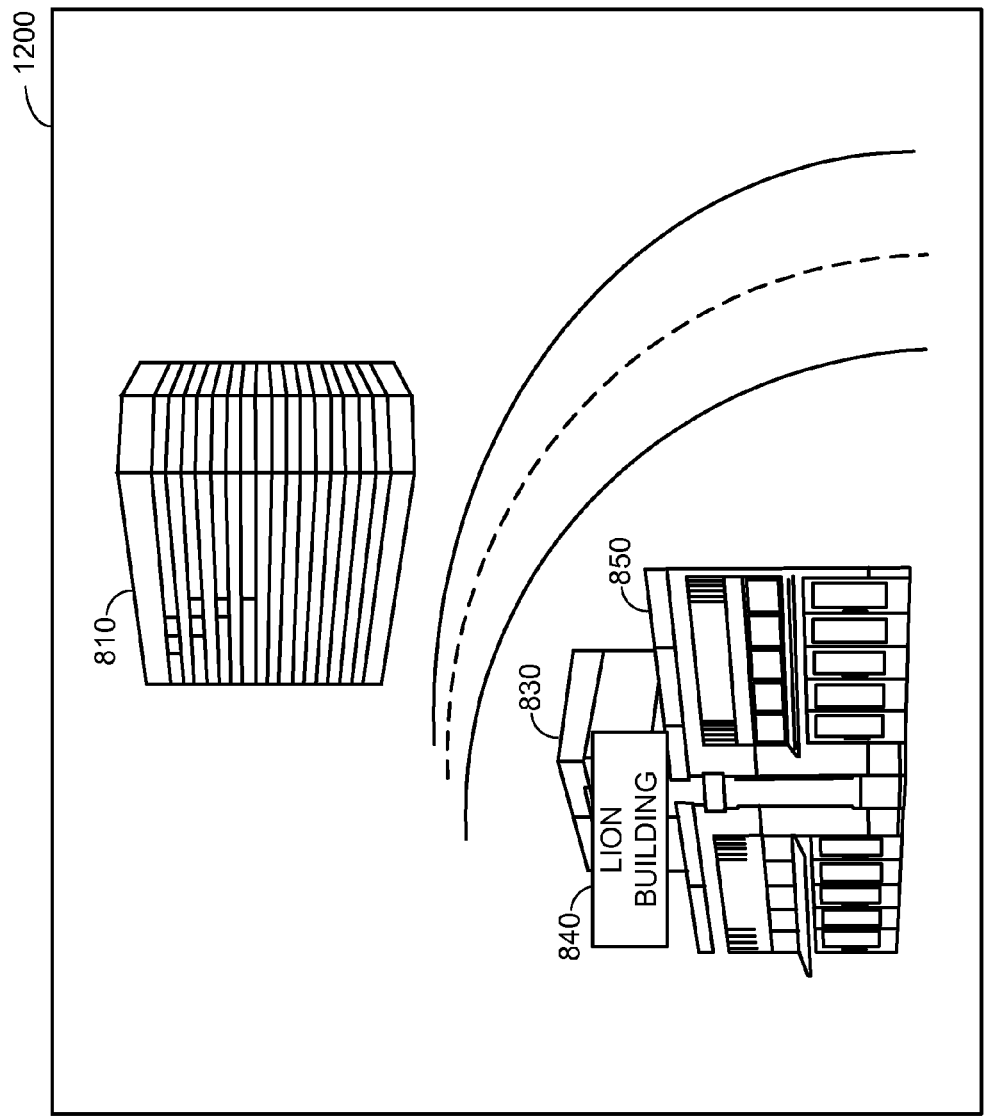
FIG. 12 illustrates a view of the street scene as seen through the lenses by a user of the wearable computer and an image of object information that is generated and displayed on the lenses based on priority data, according to one embodiment of the present disclosure.

FIG. 12 illustrates a view 1200 of a street scene as seen through the lenses 120 of the wearable computer 100 by a user and an image of the object information item 840 that is generated and displayed on the lenses 120 based on priority data, according to one embodiment of the present disclosure. As shown, the street scene seen through the lenses 120 may be substantially same as the street scene of FIG. 8. The wearable computer 100 may detect the shopping mall 810 and the plurality of buildings 830 and 850 in a captured image of the street scene, and determines object information items 820, 840, and 860 based on at least one extracted feature for each of the detected shopping mall 810 and the buildings 850, a current location of the wearable computer 100, and a view direction of the image sensor 110, as describe in detail with reference to FIG. 8.

Among the object information items 820, 840, and 860, the priority determining unit 360 in the object information generator 356 may select one or more object information items based on priority data determined from the context information database 1000. In the illustrated embodiment, the object information "LION BUILDING" 840 for the occluded building 830 is selected and displayed according to priority data. In this case, the context information database 1000 may include a context information item "LION BUILDING" with the most occurrences, and the priority determining unit 360 determines the priority data including the context information item "LION BUILDING" by accessing the context information database 1000. Alternatively, when the user inputs "LION BUILDING" as a destination object, the priority determining unit 360 can designate "LION BUILDING" with the highest priority items in the priority data.

The selected object information item 840 may be superimposed over the street scene and displayed on the lenses 120 of the wearable computer 100. In this case, the selected object information item 840 is displayed to at least partially overlap the occluded building 830 based on a location of the building 830 in the captured image. The location of the building 830 may be determined as a coordinate in the captured image when the feature extracting unit 354 detects the building 830 by segmentation of the captured image for extracting at least one feature for the building 830.

Figure 13:
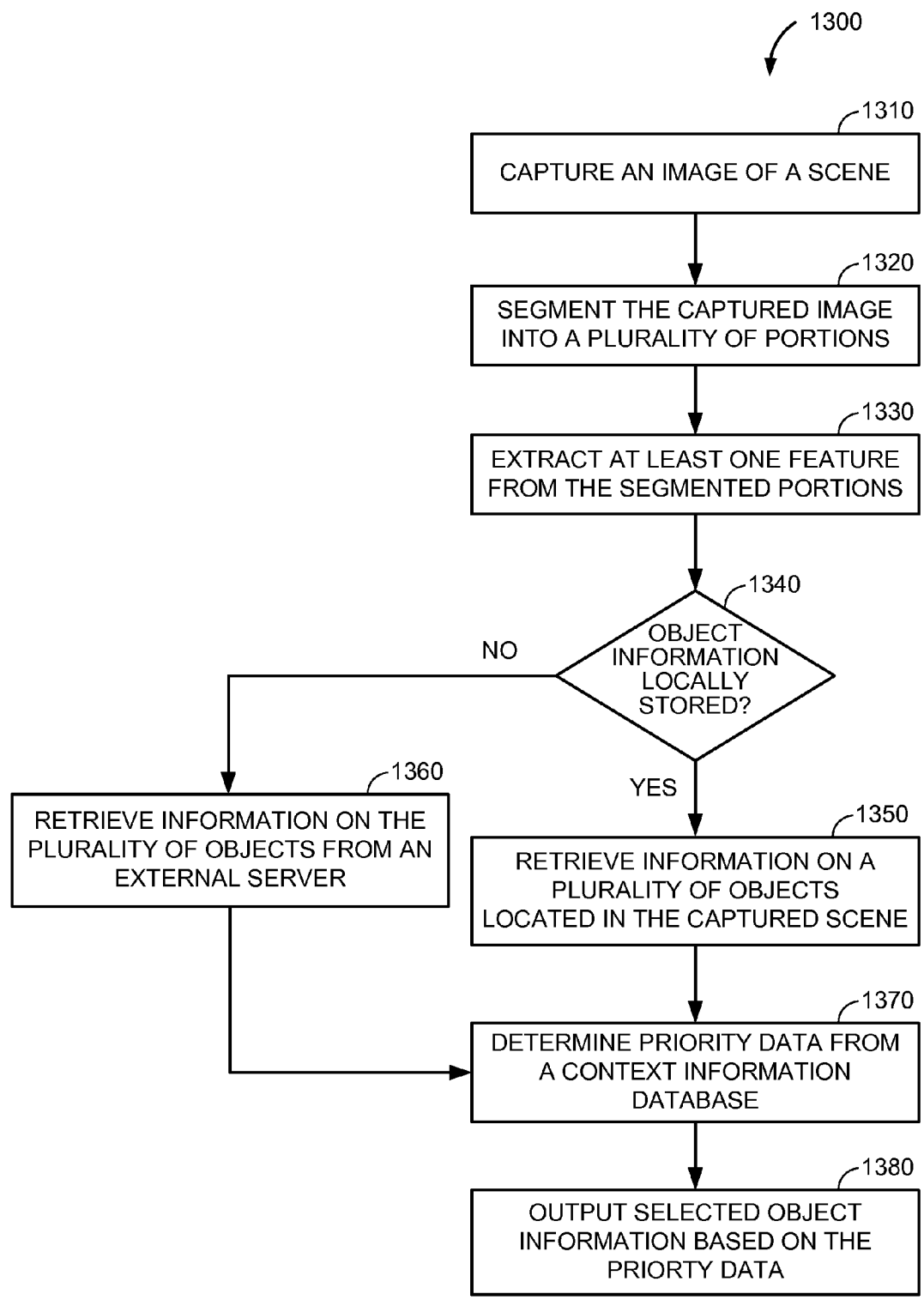
FIG. 13 is a flowchart of a method for selecting and outputting object information based on the priority data determined from the context information database, according to one embodiment of the present disclosure.

FIG. 13 is a flowchart of a method 1300 performed in the wearable computer 100 for selecting and outputting object information based on priority data determined from the context information database 1000, according to one embodiment of the present disclosure. Initially, the image sensor 110 of the wearable computer 100 captures an image of a scene, at 1310. The feature extracting unit 354 segments the captured image into a plurality of portions to detect a plurality of objects in the captured scene, at 1320.

After the captured image is segmented into the portions, at least one feature for each detected object is extracted from the segmented portions for determining information on each detected object, at 1330. In this case, the feature extracting unit 354 also determines a location of each detected object. At 1340, the method 1300 determines if information items on the objects are stored locally (e.g., in the storage unit 314 of the wearable computer 100 or a mobile device of the user that is in communication with the wearable computer 100). If it is determined that the information items are stored locally, the method proceeds to 1350 to retrieve information items on the objects from the object database in the storage unit 314 based on the extracted features. Otherwise, the method proceeds to 1360 and the object information determining unit 358 determines information items on the objects by accessing an external server and retrieving the information items on the objects from the external server based on the extracted features. In this process, the object information determining unit 358 may also use a current location of the wearable computer 100 and a view direction of the image sensor 110 that are associated with the captured image for searching the object information items from the object database stored in the storage unit 314 or the external server.

After retrieving the object information, the priority determining unit 360 searches a context information database and determines priority data for the determined object information items for selecting at least one object information item on at least one detected object, at 1370. In this case, the priority determining unit 360 determines the priority data by generating a list of context information items from the context information database. Then, at 1380, an image or a sound for the object information item selected based on the priority data is generated and output on the wearable computer 100.

Figure 14:
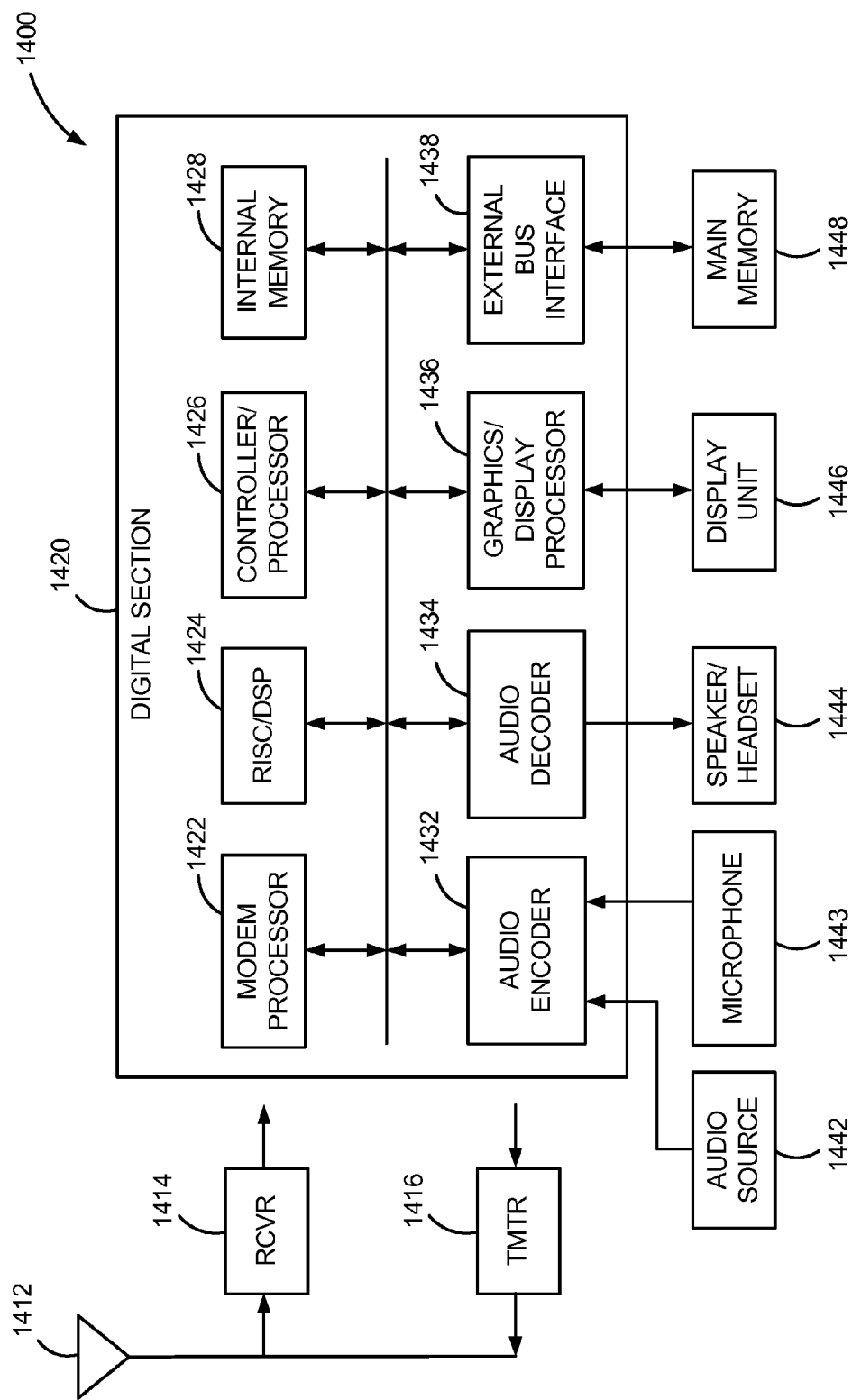
FIG. 14 is a block diagram of an exemplary wearable computer in which the methods and apparatus for providing object information for a scene in real-time may be implemented, according to one embodiments of the present disclosure.

FIG. 14 illustrates a configuration of an exemplary wearable computer 1400 in which the methods and apparatus for providing object information for a scene in real-time may be implemented in a wireless communication system, according to one embodiment of the present disclosure. The configuration of the wearable computer 1400 may be implemented in the wearable computers according to the above embodiments described with reference to FIGS. 1 to 13. The wireless communication system may be a Code Division Multiple Access (CDMA) system, a Broadcast System for Mobile Communications (GSM) system, Wideband CDMA (WCDMA) system, Long Tern Evolution (LTE) system, LTE Advanced system, etc. Further, the wearable computer 1400 may communicate directly with a mobile device, e.g., using Wi-Fi Direct, Bluetooth, FlashLinq, NFC or infrared communication technology.

The wearable computer 1400 is capable of providing bidirectional communication via a receive path and a transmit path. On the receive path, signals transmitted by base stations are received by an antenna 1412 and are provided to a receiver (RCVR) 1414. The receiver 1414 conditions and digitizes the received signal and provides samples, such as the conditioned and digitized digital signal, to a digital section 1420 for further processing. On the transmit path, a transmitter (TMTR) 1416 receives data to be transmitted from the digital section 1420, processes and conditions the data, and generates a modulated signal, which is transmitted via the antenna 1412 to the base stations. The receiver 1414 and the transmitter 1416 may be part of a transceiver that may support CDMA, GSM, LTE, LTE Advanced, etc.

The digital section 1420 includes various processing, interface, and memory units such as, for example, a modem processor 1422, a reduced instruction set computer/digital signal processor (RISC/DSP) 1424, a controller/processor 1426, an internal memory 1428, a generalized audio encoder 1432, a generalized audio decoder 1434, a graphics/display processor 1436, and an external bus interface (EBI) 1438. The modem processor 1422 may perform processing for data transmission and reception, e.g., encoding, modulation, demodulation, and decoding. The RISC/DSP 1424 may perform general and specialized processing for the wearable computer 1400. The controller/processor 1426 may perform the operation of various processing and interface units within the digital section 1420. The internal memory 1428 may store data and/or instructions for various units within the digital section 1420.

The generalized audio encoder 1432 may perform encoding for input signals from an audio source 1442, a microphone 1443, etc. The generalized audio decoder 1434 may perform decoding for coded audio data and may provide output signals to a speaker/headset 1444. The graphics/display processor 1436 may perform processing for graphics, videos, images, and texts, which may be presented to a display unit 1446. The EBI 1438 may facilitate transfer of data between the digital section 1420 and a main memory 1448. The digital section 1420 may be implemented with one or more processors, DSPs, microprocessors, RISCs, etc. The digital section 1420 may also be fabricated on one or more application specific integrated circuits (ASICs) and/or some other type of integrated circuits (ICs).

Figure 15:
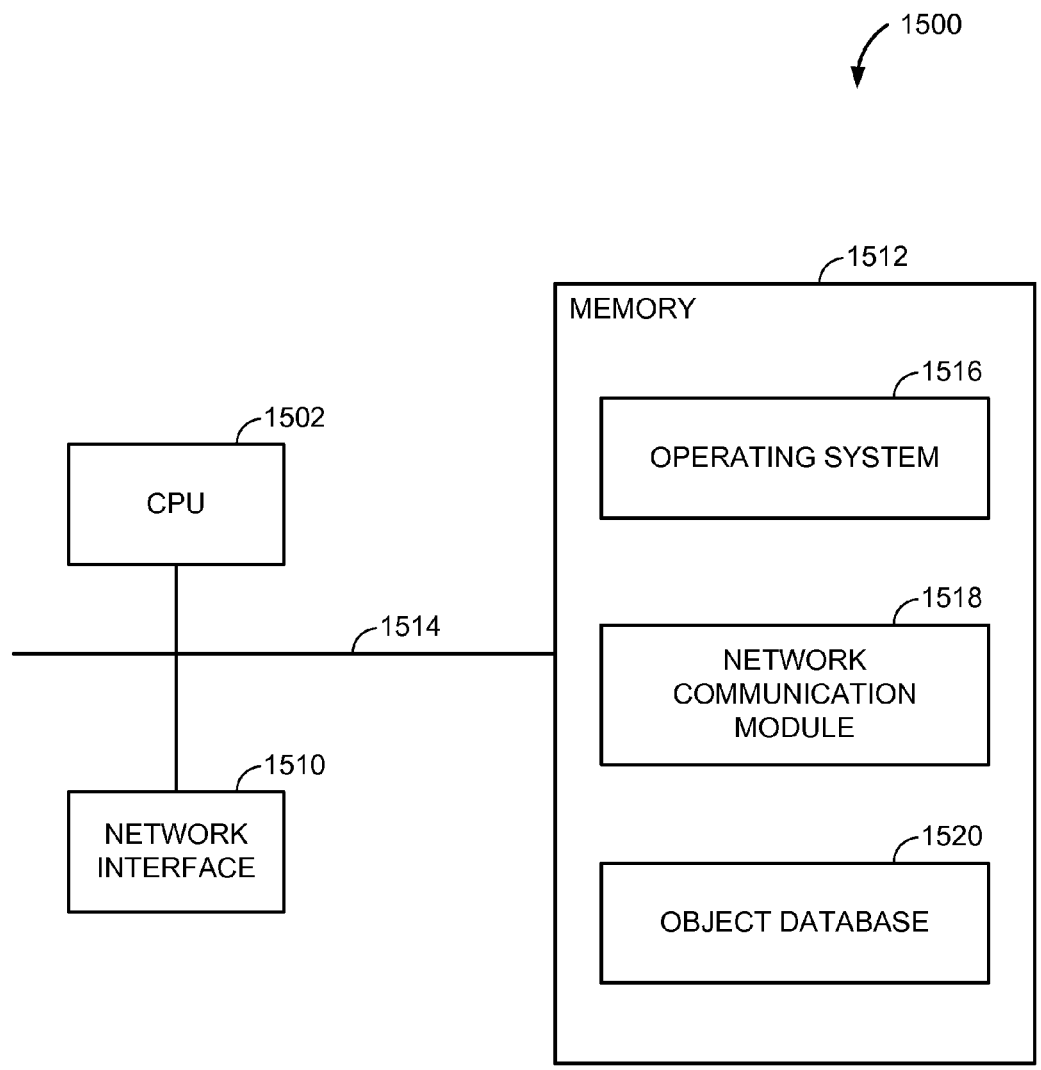
FIG. 15 is a block diagram illustrating a server system, which may be any one of the servers previously described, for providing an object database used to determine information on each detected object in a captured image, according to one embodiment of the present disclosure.

FIG. 15 is a block diagram illustrating a server system 1500, which may be any one of the external server described above, for providing an object database used to determine object information in each detected object in a captured image, according to one embodiment of the present disclosure. The server system 1500 may include one or more central processing units (CPU's) 1502, one or more network or other communications network interfaces, a memory 1512, and one or more communication buses 1514 for interconnecting these components. The server system 1500 may also include a user interface (not shown) having a display device and a keyboard.

The memory 1512 may be any suitable memory, such as a high-speed random access memory, (e.g., DRAM, SRAM, DDR RAM or other random access solid state memory devices). The memory 1512 may include or may alternatively be non-volatile memory (e.g., one or more magnetic disk storage devices, optical disk storage devices, flash memory devices, or other non-volatile solid state storage devices). In some embodiments, the memory 1512 may include one or more storage devices remotely located from the CPU(s) 1502 and/or remotely located in multiple sites.

Any one of the above memory devices represented by the memory 1512 may store any number of modules or programs that corresponds to a set of instructions for performing and/or executing any of the processes, operations, and methods described above. For example, the memory 1512 may include an operating system 1516 configured to store instructions that includes procedures for handling various basic system services and for performing hardware dependent tasks. A network communication module 1518 of the memory 1512 may be used for connecting the server system 1500 to other computers via the one or more communication network interfaces 1510 (wired or wireless) and one or more communication networks, such as the Internet, other wide area networks, local area networks, metropolitan area networks, and so on. The memory 1512 may also include an object database 1520 configured to include a set of extracted features, locations, view directions associated with objects, and information on the objects. The operating system 1516 may update the object database 1520 with current locations, view directions, features extracted from objects, and information on the objects that are received from a plurality of wearable computers through the network communication module 1518.

It will be appreciated that the above identified modules or programs (i.e., sets of instructions) need not be implemented as separate software programs, procedures or modules, and thus various subsets of these modules may be combined or otherwise re-arranged in various embodiments. Furthermore, the memory 1512 may store additional modules and data structures not described above.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium.

For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of providing object information for a scene captured by a wearable computer, the method comprising:
    capturing an image of the scene;
    determining a location of the wearable computer and a view direction of an image sensor of the wearable computer;
    extracting at least one feature from the image indicative of at least one object;
    determining a plurality of information items corresponding to the at least one object based on the location, the view direction, and the at least one feature;
    selecting at least one information item of the plurality of information items based on priority data; and
    outputting the selected at least one information item.

2. The method of claim 1, wherein the plurality of information items corresponding to the at least one object include information related to an occluded object in the captured image.

3. The method of claim 1, wherein determining the plurality of information items corresponding to the at least one object comprises determining information related to an indoor scene of the at least one object.

4. The method of claim 1, further comprising retrieving the plurality of information items corresponding to the at least one object from the wearable computer.

5. The method of claim 1, further comprising retrieving the plurality of information items corresponding to the at least one object from an external device.

6. The method of claim 5, wherein the external device includes at least one of a mobile device and an external server.

7. The method of claim 1, wherein a plurality of predetermined features indicative of a plurality of objects are mapped to at least one of a plurality of locations, a plurality of view directions, and information related to the plurality of objects in an object database.

8. The method of claim 7, wherein determining the plurality of information items corresponding to the at least one object comprises:
    selecting a plurality of candidate features from the plurality of predetermined features based on the location and the view direction;
    identifying at least one of the plurality of candidate features based on the extracted at least one feature; and
    retrieving the plurality of information items based on the identified at least one candidate feature.

9. The method of claim 8, further comprising determining a difference between the location and each of the plurality of locations associated with the plurality of candidate features, wherein selecting the plurality of candidate features is performed in response to determining that the difference is within a threshold.

10. The method of claim 8, further comprising determining a difference between the view direction and each of the plurality of view directions associated with the plurality of candidate features, wherein selecting the plurality of candidate features is performed in response to determining that the difference is within a threshold.

11. The method of claim 1, further comprising prioritizing the plurality of information items based on the priority data, wherein the priority data is determined based on at least one keyword received at the wearable computer.

12. The method of claim 1, wherein the priority data is determined based on at least one search query.

13. The method of claim 1, wherein the priority data is determined based on destination information.

14. The method of claim 1, wherein the at least one object comprises a plurality of objects, and wherein extracting the at least one feature comprises:
    segmenting the image into a plurality of portions, wherein each portion of the plurality of portions corresponds to a particular object of the plurality of objects; and
    extracting the at least one feature from at least one of the portions.

15. A wearable computer for providing object information for a scene, the wearable computer comprising:
    an image sensor configured to capture an image of the scene;
    a location determining unit configured to determine a location of the wearable computer;
    a direction determining unit configured to determine a view direction of the image sensor of the wearable computer;
    a feature extracting unit configured to extract at least one feature from the image indicative of at least one object;
    an object information generator configured to:
        determine a plurality of information en items corresponding to the at least one object based on the location, the view direction, and the at least one feature; and
        select at least one information item of the plurality of information items based on priority data; and
    an output unit configured to output the selected at least one information item.

16. The wearable computer of claim 15, wherein the plurality of information items corresponding to the at least one object includes information related to an occluded object in the captured image.

17. The wearable computer of claim 15, wherein the object information generator is further configured to determine information related to an indoor scene of the at least one object.

18. The wearable computer of claim 15, wherein the object information generator is further configured to retrieve the plurality of information items corresponding to the at least one object from the wearable computer.

19. The wearable computer of claim 15, wherein the object information generator is further configured to retrieve the plurality of information items corresponding to the at least one object from an external device.

20. The wearable computer of claim 19, wherein the external device includes at least one of a mobile device and an external server.

21. The wearable computer of claim 15, wherein a plurality of predetermined features indicative of a plurality of objects are mapped to at least one of a plurality of locations, a plurality of view directions, and information related to the plurality of objects in an object database.

22. The wearable computer of claim 21, wherein the object information generator is configured to select a plurality of candidate features from the plurality of predetermined features based on the location and the view direction, to identify at least one of the candidate features based on the extracted at least one feature, and to retrieve the plurality of information items based on the identified at least one candidate feature.

23. The wearable computer of claim 22, wherein the object information generator is configured to select the plurality of candidate features in response to determining that a difference between the location and each of the plurality of locations associated with the plurality of candidate features is within a threshold.

24. The wearable computer of claim 22, wherein the object information generator is configured to select the plurality of candidate features in response to determining that a difference between the view direction and each of the plurality of view directions associated with the plurality of candidate features is within a threshold.

25. The wearable computer of claim 15, wherein the priority data is determined based on at least one keyword received in the wearable computer.

26. The wearable computer of claim 15, wherein the priority data is determined based on at least one search query.

27. The wearable computer of claim 15, wherein the priority data is determined based on destination information.

28. The wearable computer of claim 15, wherein the feature extracting unit is further configured to segment the captured image into a plurality of portions, and to extract the at least one feature from at least one of the portions, wherein the at least one object comprises a plurality of objects, and wherein each portion of the plurality of portions corresponds to a particular object of the plurality of objects.

29. The wearable computer of claim 15, wherein the object information generator is configured to determine the priority data by accessing a context information database in a storage unit.

30. The wearable computer of claim 29, wherein the priority data corresponds to preferences of a user, and wherein the priority data is determined based on historical data, past user inputs, or a combination thereof.

31. A wearable computer for providing object information for a scene, comprising:
  means for capturing an image of the scene;
  means for determining a location of the wearable computer;
  means for determining a view direction of an image sensor of the wearable computer;
  means for extracting at least one feature from the image indicative of at least one object;
  means for determining a plurality of information items corresponding to the at least one object based on the location, the view direction, and the at least one feature;
  means for selecting at least one information item of the plurality of information items based on priority data; and
  means for outputting the selected at least one information item.

32. The wearable computer of claim 31, wherein the plurality of information items corresponding to the at least one object includes information related to an occluded object in the captured image.

33. The wearable computer of claim 31, wherein the means for determining the plurality of information items corresponding to the at least one object comprises means for determining information related to an indoor scene of the at least one object.

34. The wearable computer of claim 31, wherein the means for determining the plurality of information items corresponding to the at least one object comprises means for retrieving the plurality of information items corresponding to the at least one object from the wearable computer.

35. The wearable computer of claim 31, wherein the means for determining the plurality of information items corresponding to the at least one object comprises means for retrieving the plurality of information items corresponding to the at least one object from an external device.

36. The wearable computer of claim 35, wherein the external device includes at least one of a mobile device and an external server.

37. The wearable computer of claim 31, wherein a plurality of predetermined features indicative of a plurality of objects are mapped to at least one of a plurality of locations, a plurality of view directions, and information related to the plurality of objects in an object database.

38. The wearable computer of claim 37, wherein the means for determining the plurality of information en items corresponding to the at least one object comprises:
  means for selecting a plurality of candidate features from the plurality of predetermined features based on the location and the view direction;
  means for identifying at least one of the candidate features based on the extracted at least one feature; and
  means for retrieving the plurality of information items based on the identified at least one candidate feature.

39. The wearable computer of claim 38, wherein the plurality of candidate features are selected if a difference between the location and each of the plurality of locations associated with the plurality of candidate features is within a threshold.

40. The wearable computer of claim 38, wherein the plurality of candidate features are selected if a difference between the view direction and each of the plurality of view directions associated with the plurality of candidate features is within a threshold.

41. A non-transitory computer-readable storage medium comprising instructions for providing object information for a scene in a wearable computer, the instructions causing a processor of the wearable computer to perform operations of:
  capturing an image of the scene;
  determining a location of the wearable computer and a view direction of an image sensor of the wearable computer;
  extracting at least one feature from the image indicative of at least one object;
  determining a plurality of information items corresponding to the at least one object based on the location, the view direction, and the at least one feature;
  selecting at least one information item of the plurality of information items based on priority data; and
  outputting the selected at least one information item.

42. The medium of claim 41, wherein the plurality of information items corresponding to the at least one object includes information related to an occluded object in the captured image.

43. The medium of claim 41, wherein determining the plurality of information items corresponding to the at least one object comprises determining information related to an indoor scene of the at least one object.

44. The medium of claim 41, further comprising retrieving the plurality of information items from the wearable computer.

45. The medium of claim 41, further comprising retrieving the plurality of information items from an external device.

46. The medium of claim 45, wherein the external device includes at least one of a mobile device and an external server.

47. The medium of claim 41, wherein a plurality of predetermined features indicative of a plurality of objects are mapped to at least one of a plurality of locations, a plurality of view directions, and information related to the plurality of objects in an object database.

48. The medium of claim 47, wherein determining the plurality of information items corresponding to the at least one object comprises:
    selecting a plurality of candidate features from the plurality of predetermined features based on the location and the view direction;
    identifying at least one of the candidate features based on the extracted at least one feature; and
    retrieving the plurality of information items based on the identified at least one candidate feature.

49. The medium of claim 48, wherein the plurality of candidate features are selected if a difference between the location and each of the plurality of locations associated with the plurality of candidate features is within a threshold.

50. The medium of claim 48, wherein the plurality of candidate features are selected if a difference between the view direction and each of the plurality of view directions associated with the plurality of candidate features is within a threshold.

* * * * *